United States Patent
Prabhu et al.

(10) Patent No.: US 12,470,355 B2
(45) Date of Patent: Nov. 11, 2025

(54) ACK COALESCING PERFORMANCE THROUGH DYNAMIC STREAM SELECTION

(71) Applicant: QUALCOMM Incorporated, San Diego, CA (US)

(72) Inventors: Rohan Prabhu, Hyderabad (IN); Prachi Agrawal, Hyderabad (IN); Rajashekar Chilla, San Diego, CA (US); Prasad Gadde, Hyderabad (IN); Vijay Kumar Bolleni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 17/930,405

(22) Filed: Sep. 7, 2022

(65) Prior Publication Data

US 2024/0080165 A1   Mar. 7, 2024

(51) Int. Cl.
  *H04L 1/16*   (2023.01)
  *H04L 5/00*   (2006.01)
(52) U.S. Cl.
  CPC .................. *H04L 5/0055* (2013.01)
(58) Field of Classification Search
  CPC .......... G06N 3/02; G06N 3/042; G06N 3/044; G06N 3/0442; G06N 3/045; G06N 3/0455; G06N 3/0464; G06N 3/0499; G06N 3/08; G06N 3/088; G06N 3/09; G06N 3/091; G06N 3/092; G06N 20/00; G06N 20/10; H04B 17/3912; H04B 17/3913; H04L 25/0254; H04L 25/03165; H04L 2012/05686; H04L 2025/03464; H04L 41/145; H04L 41/16; H04L 45/08; H04L 1/1851; H04L 1/1854; H04L 5/0055; H04L 47/193; H04L 47/2466; H04L 47/27;
(Continued)

(56) References Cited

U.S. PATENT DOCUMENTS 7,324,525 B2 *  1/2008  Fuhs ................ H04L 12/56
                                            370/395.7
7,826,487 B1 * 11/2010  Mukerji ............ H04L 69/04
                                            370/477
(Continued)

FOREIGN PATENT DOCUMENTS

WO   2019183519 A1   9/2019

OTHER PUBLICATIONS

International Search Report and Written Opinion—PCT/US2023/031301—ISA/EPO—Dec. 11, 2023.

*Primary Examiner* — Frank Duong
(74) *Attorney, Agent, or Firm* — QUALCOMM Incorporated

(57) ABSTRACT

A receiver may receive a plurality of data streams from a transmitter, each data stream of the plurality of data streams including at least one data stream, rank at least a subset of the plurality of data streams based on a metric that is based on a number of ACKs associated with each data stream, and transmit at least one subset of ACKs for the subset of data streams, wherein each subset of ACKs of the at least one subset of ACKs indicates a plurality of ACKs for a subset of packets of the subset of data streams. The rank of at least the subset of the plurality of data streams is generated based at least in part on an estimated number of ACKs for each data stream of the plurality of data streams.

30 Claims, 13 Drawing Sheets

(58) Field of Classification Search
CPC .... H04L 47/323; H04L 69/163; H04W 16/22; H04W 4/70
See application file for complete search history.

(56) References Cited

U.S. PATENT DOCUMENTS

| | | | |
|---|---|---|---|
| 10,212,623 B2* | 2/2019 | Ben-Haim | H04L 69/22 |
| 10,645,200 B2* | 5/2020 | Gil | G06F 13/128 |
| 12,040,988 B2* | 7/2024 | Vaduvatha | H04L 1/1832 |
| 2004/0196785 A1* | 10/2004 | Janakiraman | H04L 47/11 370/229 |
| 2005/0147039 A1* | 7/2005 | Biran | H04L 69/163 370/235 |
| 2006/0067222 A1* | 3/2006 | Endoh | H04L 69/163 370/231 |
| 2017/0063498 A1* | 3/2017 | Venkatsuresh | H04L 69/16 |
| 2017/0168986 A1 | 6/2017 | Sajeepa et al. | |
| 2019/0297020 A1* | 9/2019 | Mudireddy | H04L 1/1854 |
| 2024/0014981 A1* | 1/2024 | Yang | G06N 3/096 |

* cited by examiner

ACK COALESCING PERFORMANCE THROUGH DYNAMIC STREAM SELECTION

TECHNICAL FIELD

The present disclosure relates generally to communication systems, and more particularly, to a method of wireless communication including acknowledgment (ACK) coalescing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a receiver configured to receive a plurality of data streams from a transmitter, each data stream of the plurality of data streams including at least one data stream, rank at least a subset of the plurality of data streams based on a metric that is based on a number of ACKs associated with each data stream, and transmit at least one subset of ACKs for the subset of data streams, where each subset of ACKs of the at least one subset of ACKs indicates a plurality of ACKs for a subset of packets of the subset of data streams.

In another aspect of the disclosure, a method, a computer-readable medium, and an apparatus are provided. The apparatus may be a transmitter configured to transmit a plurality of data streams to a receiver, obtain a list of a subset of data streams of the plurality of data streams from the receiver, the list of subset of data streams indicating ranks of each data stream of the subset of data streams based on a metric of each data stream being based at least on each number of ACKs generated for each data stream, and receive at least one subset of ACKs for the subset of data streams, where each subset of ACKs of the at least one subset of ACKs indicates a plurality of ACKs for a subset of packets of the subset of data streams.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
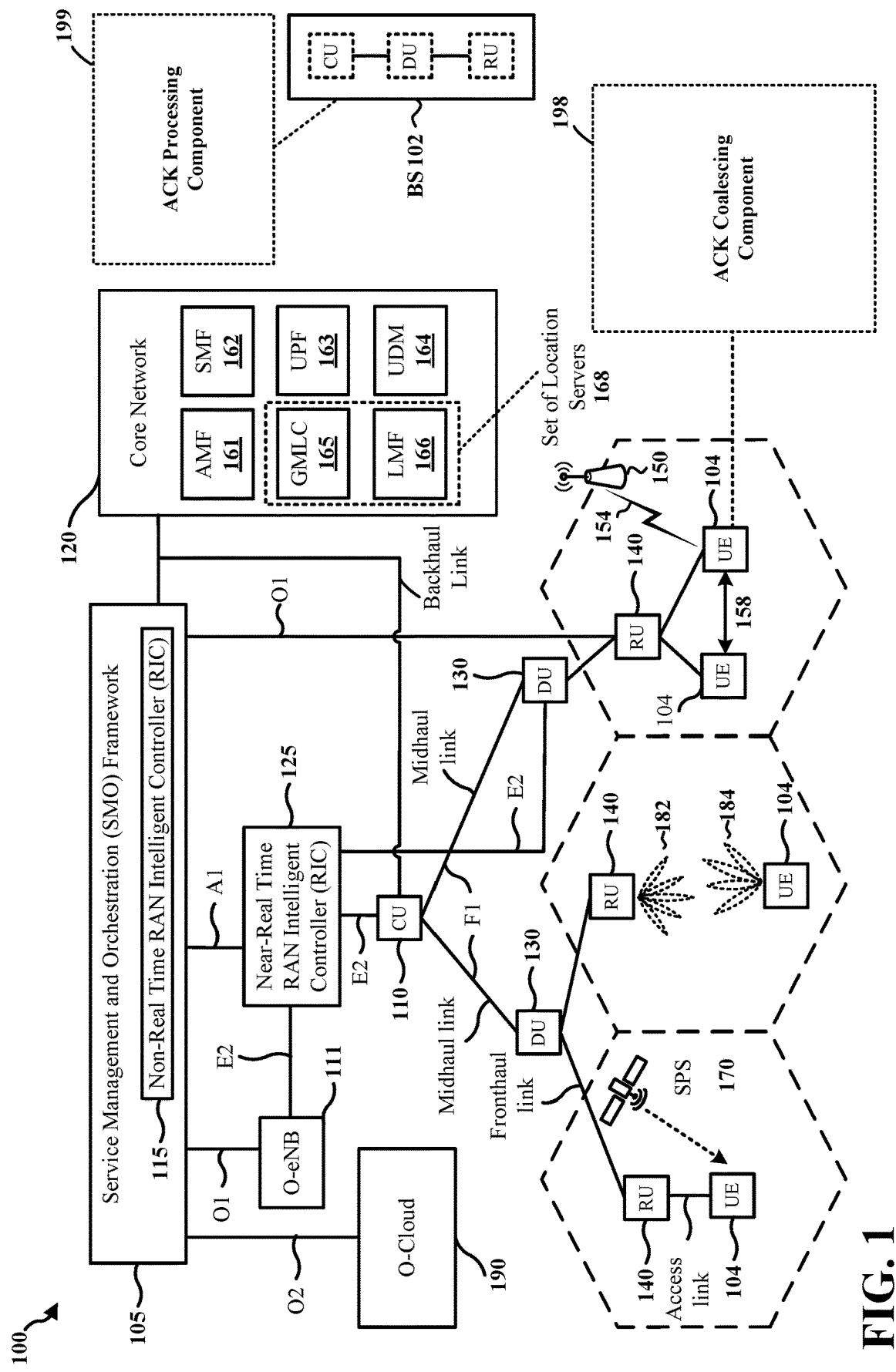
FIG. 1 is a diagram illustrating an example of a wireless communications system and an access network.

In some examples, a receiver receiving data stream including multiple data packets from a transmitter may coalesce acknowledgements (ACKs) to reduce the number of ACKs transmitted, e.g., by sending a subset of ACKs to confirm multiple data packets of a data stream. As the receiver may be configured with a maximum number of data streams to monitor and perform the ACK coalescing, the ACK coalescing may be performed on a first-come-first-served basis, which may reduce the efficiency of the ACK coalescing when the receiver is handling a larger number of data streams that exceeds the maximum number of data streams configured for the ACK coalescing. In some aspects of the current disclosure, the receiver may improve the performance of the ACK coalescing through dynamically selecting the data streams for which the receiver will perform the ACK coalescing.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub –6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an ACK coalescing component 198 configured to receive a plurality of data streams from a transmitter, each data stream of the plurality of data streams including at least one data stream, rank at least a subset of the plurality of data streams based on a metric that is based on a number of ACKs associated with each data stream, and transmit at least one subset of ACKs for the subset of data streams, where each subset of ACKs of the at least one subset of ACKs indicates a plurality of ACKs for a subset of packets of the subset of data streams. In certain aspects, the base station 102 may include an ACK processing component 199 configured to transmit a plurality of data streams to a receiver, obtain a list of a subset of data streams of the plurality of data streams from the receiver, the list of subset of data streams indicating ranks of each data stream of the subset of data streams based on a metric of each data stream being based at least on each number of ACKs generated for each data stream, and receive at least one subset of ACKs for the subset of data streams, where each subset of ACKs of the at least one subset of ACKs indicates a plurality of ACKs for a subset of packets of the subset of data streams. Although the following description may be focused on 5G NR, the concepts described herein may be applicable to other similar areas, such as LTE, LTE-A, CDMA, GSM, and other wireless technologies.

Figure 2:
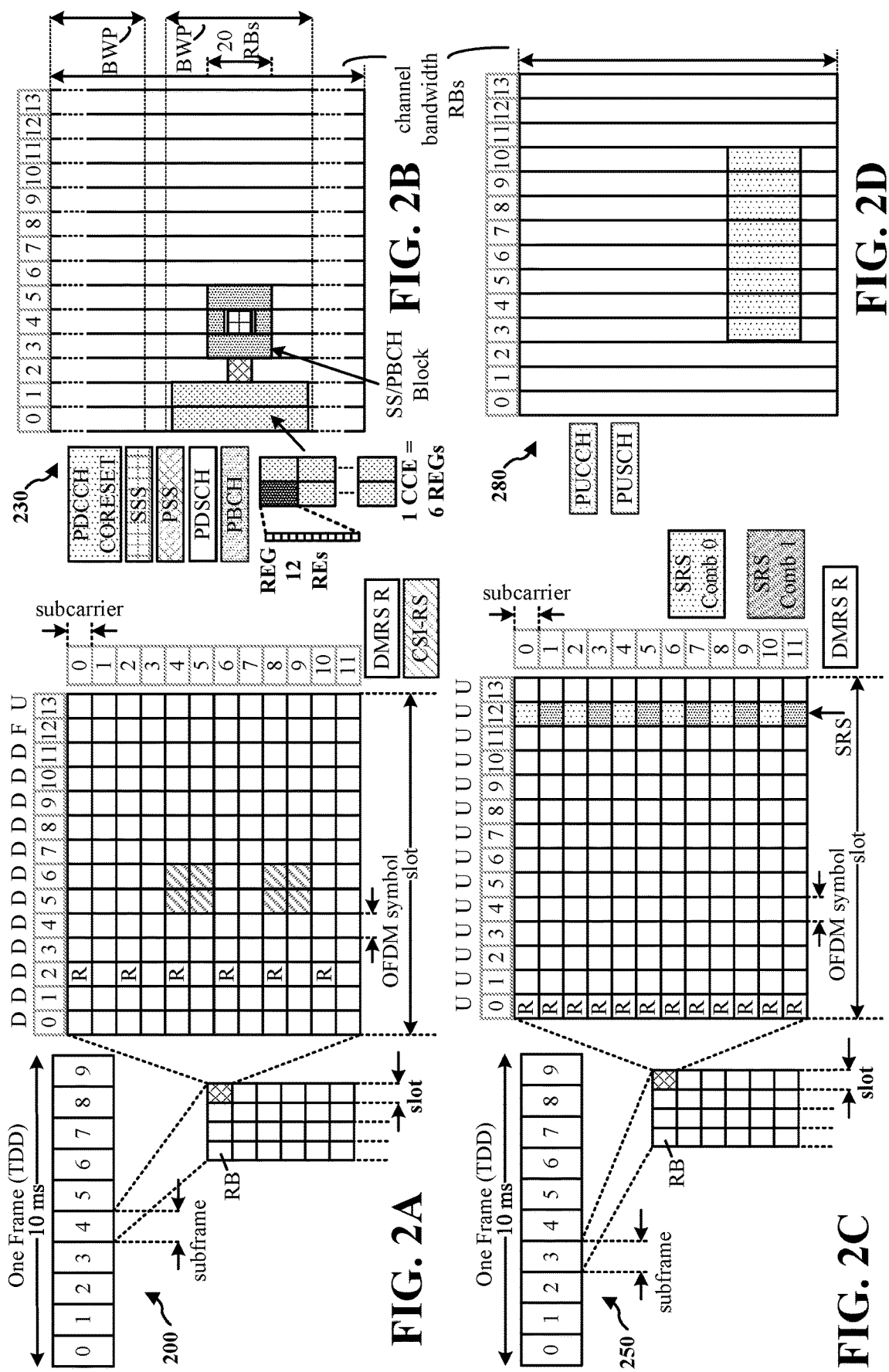
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology 1.1=4 has a subcarrier spacing of 240 kHz. The symbol length/ duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
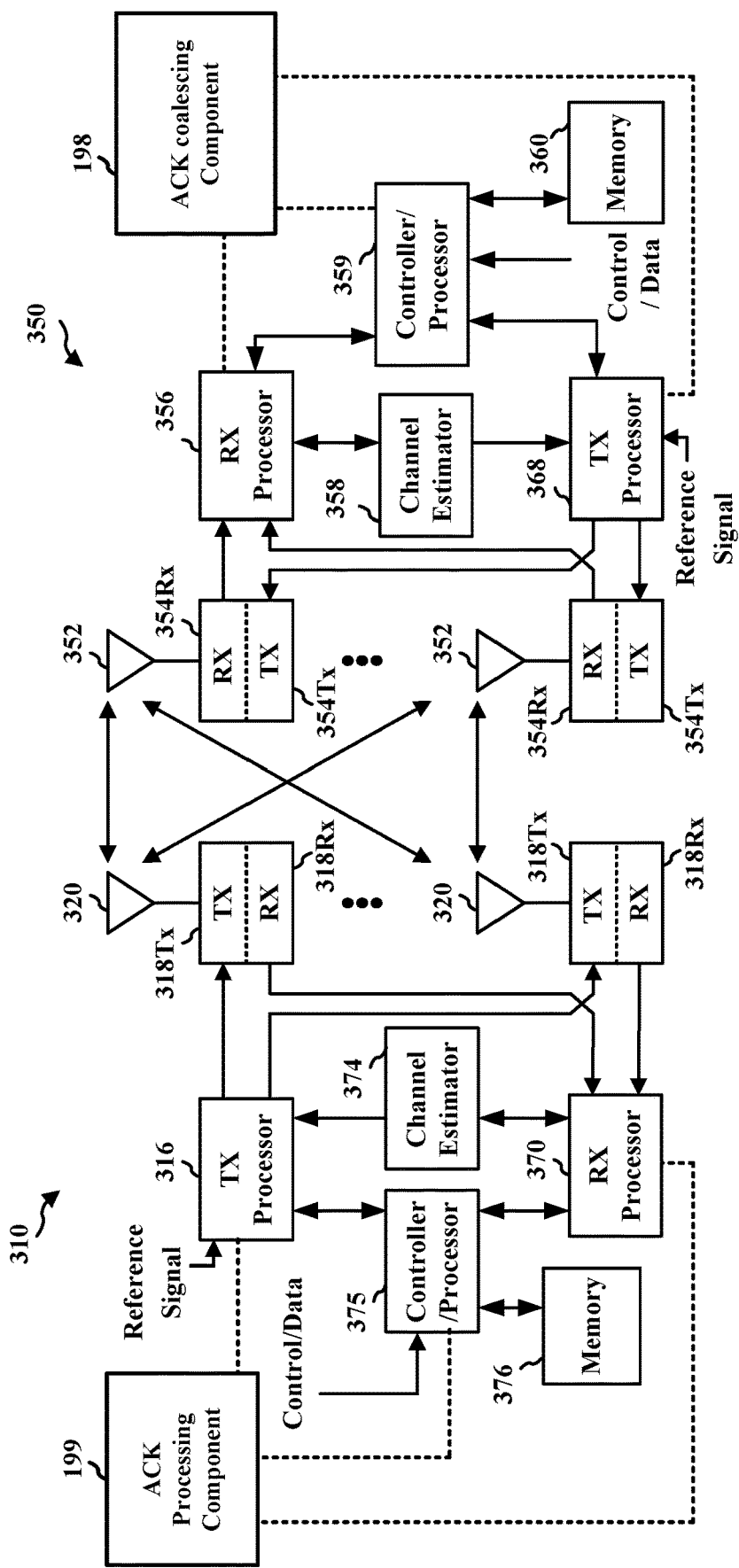
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with the ACK coalescing component 198 of FIG. 1. At least one of the TX processor 316, the RX processor 370, and the controller/processor 375 may be configured to perform aspects in connection with the ACK processing component 199 of FIG. 1.

Figure 4:
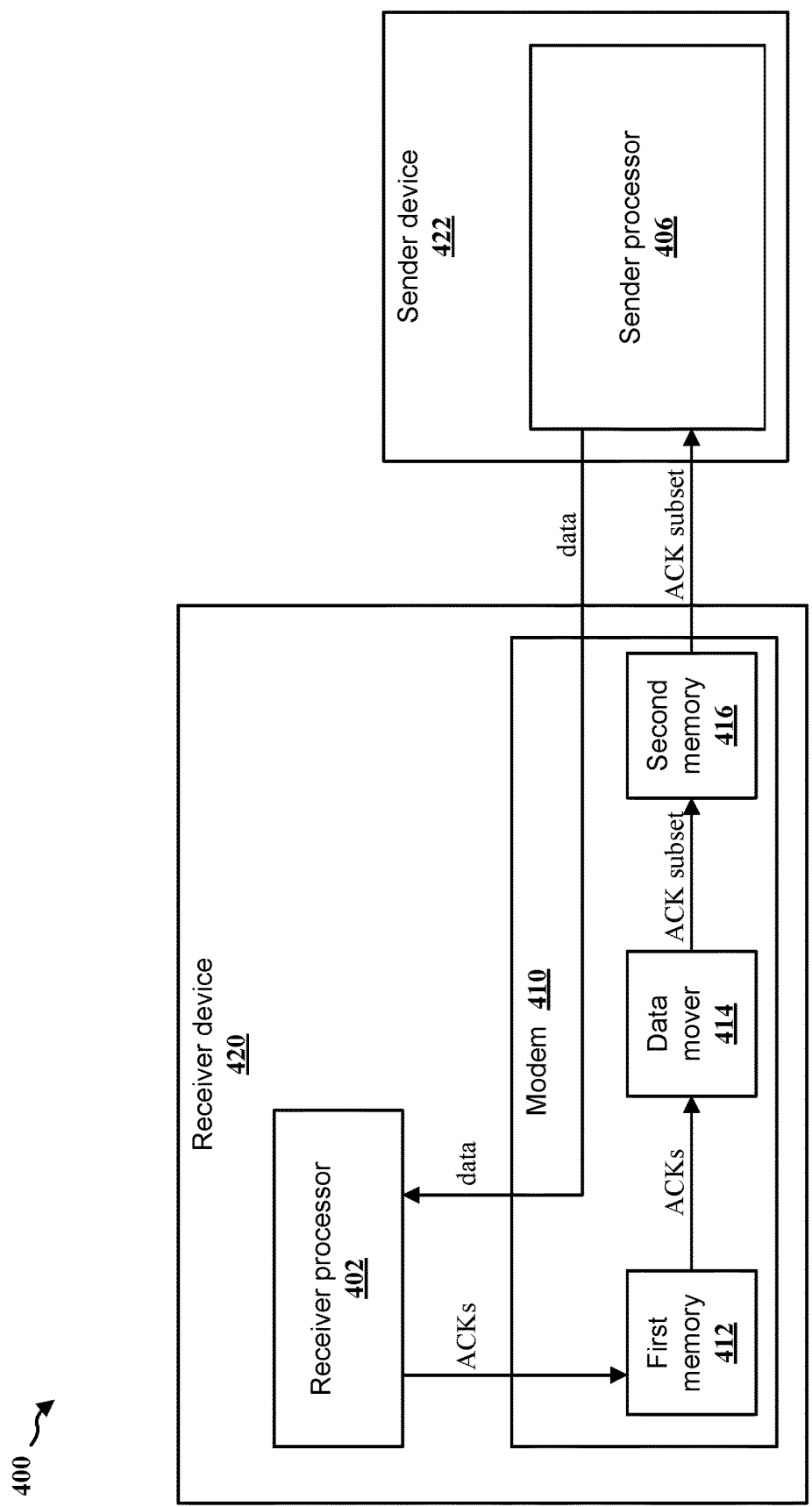
FIG. 4 is a component diagram illustrating an example of an ACK coalescing.

FIG. 4 is a component diagram 400 illustrating an example of an ACK coalescing (e.g., ACK reduction). As illustrated in diagram 400, a sender processor 406 of a sender device 422 may send data packets to a receiver processor 402 of a receiver device 420. Here, the data packets may be associated with a transmission control protocol (TCP) stream. The sender processor 406 may be an application processor that handles tasks related to one or more applications running on the sender device 422. The receiver processor 402 may be an application processor that handles tasks related to one or more applications running on the receiver device 420. In one configuration, the receiver processor 402 may operate using a TCP protocol. The receiver device 420 also includes a modem 410. The modem 410 may include a first memory 412, a data mover 414, and a second memory 416.

The data packets are received at the receiver device 420 through the modem 410. In response to the reception of the data packets, the receiver processor 402 or the modem 410 may generate ACKs for the received data packets. The generated ACKs may be stored at the first memory 412. The first memory 412 may be a physical or logical memory that is associated with the modem 410. In one configuration, the first memory 412 may be a part of the modem 410. In another configuration, the first memory 412 may be outside, or separate from, the modem 410.

The data mover 414 may transfer each of the ACKs stored at the first memory 412 to the second memory 416. Under some conditions, the data mover 414 may identify a subset of the ACKs stored at the first memory 412 and move the subset of ACKs to the second memory 416 thereby reducing (e.g., decimating) the ACKs. In one configuration, the subset of ACKs may be a proper subset of the ACKs stored at the first memory 412. By moving a subset of the ACKs to the second memory 416, modem memory space (e.g., memory space of the second memory 416) may be saved, thus reducing modem overhead and cost. In another configuration, all the ACKs stored at the first memory 412 may be moved to the second memory 416 by the data mover 414.

In some aspects, the ACK coalescing may be performed based on various conditions. In one aspect, the ACK coalescing may be performed based on the ACK rate being high (e.g., the number of ACKs in the current interval being greater than a threshold ACK count) and/or when the modem processor work load is high (e.g., modem load being great than a threshold modem load). In another aspect, the ACK coalescing may be performed based on memory utilization of the receiver device 420 being high (e.g., memory utilization satisfies a memory utilization threshold condition, for instance, by exceeding a defined memory utilization amount or by meeting or exceeding a defined memory utilization amount).

Based on the ACK coalescing (e.g., ACK reduction), the network overhead of processing the ACK messaging of a plurality of TCP streams may be reduced. In one aspect, a modem of a receiver (e.g., the UE) may be configured with a number of TCP streams that the modem may monitor, or sample, for the ACK coalescing. For example, the modem of the receiver may be configured to monitor or sample 20 TCP streams to perform the ACK coalescing. That is, the maximum number of TCP streams configured for the ACK coalescing may indicate the maximum number that the receiver may monitor and for which the UE may perform the ACK coalescing.

The TCP steams to perform the ACK coalescing may be selected or determined based on a first-come-first-served basis. In a case of processing a low number of TCP streams (e.g., lower than or close to the maximum number of TCP streams configured for the ACK coalescing), the first-come-first-served basis selection of the TCP streams may not reduce the ACK coalescing efficiency. In another case of processing a higher number of TCP streams (e.g., substantially higher than the maximum number of TCP streams configured for the ACK coalescing), the streams with a higher throughput may precede streams with a lower throughput, which may reduce the ACK coalescing efficiency. That is, when processing the higher number of TCP streams on the first-come-first-served basis, the TCP streams with the higher throughput that are received before the TCP streams with the lower throughput may reduce the ACK coalescing efficiency because the TCP streams with the higher throughput may require a lower number of ACKs than the TCP streams with the lower throughput.

In another example, some TCP streams may be configured to be associated with a lower priority regardless of the number of ACKs configured. For example, multi-stream remote network driver interface specification (RNDIS) TCP DL streams may have a lower priority than multi-stream embedded TCP DL streams, and the RNDIS TCP DL streams may be configured with a greater number of ACKs compared to the embedded DL streams in case of peak throughputs. Accordingly, the receiver may prioritize the embedded DL streams over the RNDIS TCP DL streams for the ACK coalescing, which may reduce the ACK coalescing efficiency.

In one aspect, the maximum number of TCP streams configured for the ACK coalescing may be increased as a brute-force way to address the high number of TCP streams. For example, the receiver may be configured with the maximum number of 30 TCP streams configured for the ACK coalescing rather than 20 TCP streams. Even with the increase to the maximum number of streams, there may be a higher number of TCP streams (e.g., 100 TCP streams when the maximum number was increased to 30 TCP streams). That is, for the similar reasons provided above, even with the maximum number of TCP streams configured for the ACK coalescing, a receiver may continue to experience reduced ACK coalescing efficiency in cases involving ultra-high number of streams and/or asymmetrical distribution of throughputs across the streams.

Furthermore, increasing the number of ACKs in the UL may have a greater effect on bidirectional scenarios (e.g., file transfer protocol (FTP) bidirectional scenario). More particularly, in an example of NR TDD, the UL and the DL communication share the time-frequency resources, and the resources in UL may be assigned at the cost of resources in DL, and the UL throughput may be reduced based on the DL resources allocations.

TABLE 2

| | | | | | numbers of streams, ACK coalescing efficiency | | |
|---|---|---|---|---|---|---|---|
| Scenario | Number of streams used | Config | ACK Sent by AP | ACK forwarded to L2 | ACK Coalescing Efficiency | % efficiency | Throughput Observed |
| Embedded IPv4 FTP DL | 20 stream | Default Delay | 111717 | 59634 | 1.87 | 87% | 1996.09 |
| | 30 stream | | 130937 | 72583 | 1.80 | 80% | 1994.74 |
| | 40 stream | | 124738 | 77563 | 1.608 | 61% | 1997.09 |
| | 50 stream | | 143141 | 101225 | 1.414 | 41% | 2000.08 |
| | 100 stream | | 180949 | 155978 | 1.16 | 16% | 1988.10 |
| | 150 stream | | 263948 | 240369 | 1.09 | 9% | 1986.66 |
| | 200 stream | | 359144 | 342983 | 1.047 | 5% | 1982.38 |

Table 2 shows an example of ACK coalescing efficiency based on the number of TCP streams. Here, the FTP is an application layer protocol which uses TCP as its transport layer protocol. For example, the FTP may use the TCP as the transport layer protocol. Based on the example illustrated by Table 2, the ACK coalescing efficiency may be reduced in response to an increased number of streams used. That is, the ACK coalescing efficiency may decrease with an increase in the number of TCP streams.

Figure 5:
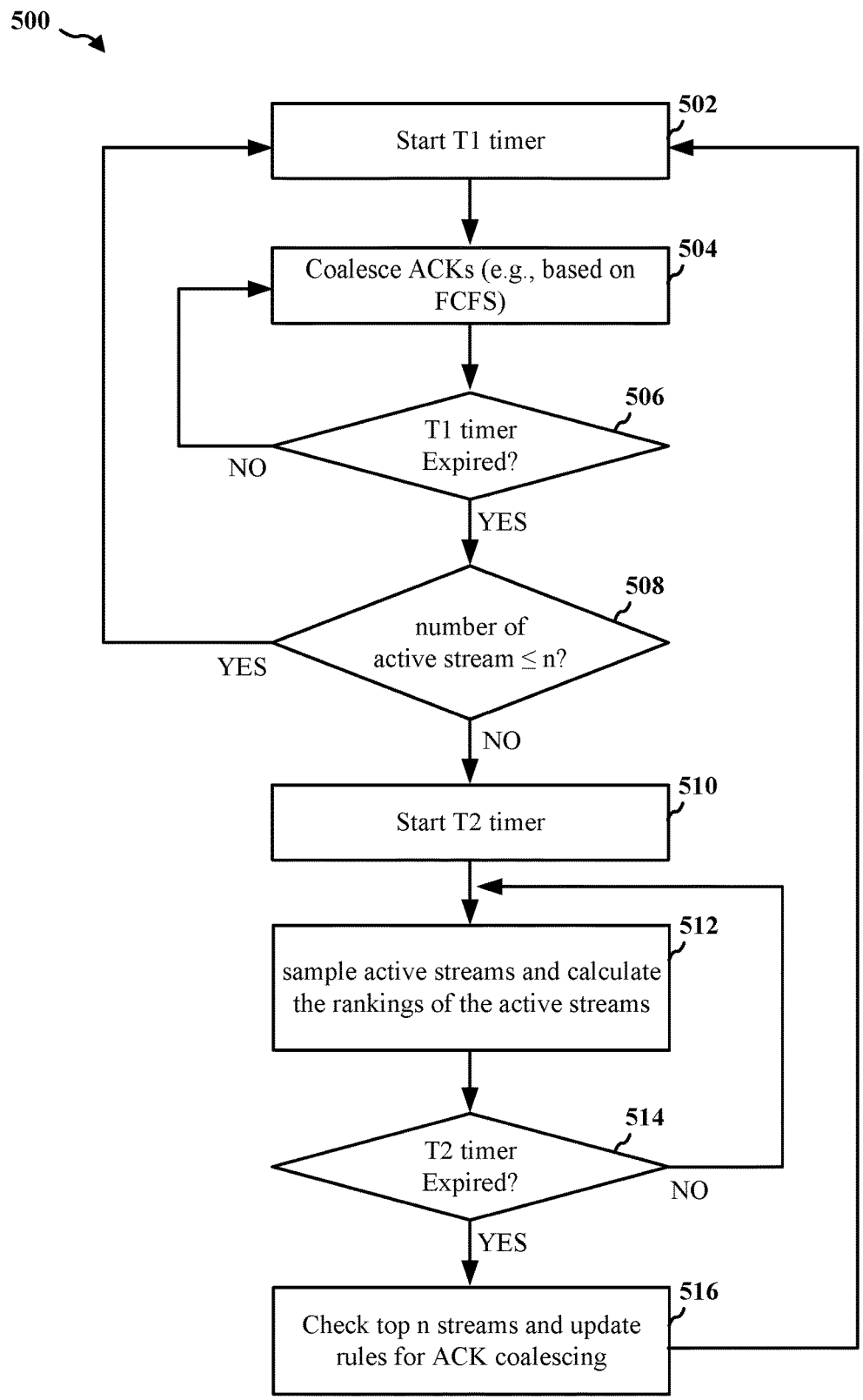
FIG. 5 is a flow chart of a method of wireless communication including an ACK coalescing.

FIG. 5 is a flow chart 500 of a method of wireless communication including an ACK coalescing. The flow chart 500 may be performed by a receiver. In some aspects, according of the flow chart 500, the receiver may actively track each data stream for the number of ACKs generated by a corresponding data stream. The receiver may perform an ACK coalescing for the data stream (or a number of data streams) which is responsible for a relatively higher number of ACKs. That is, the receiver performing the flow chart 500 may actively monitor the received data streams and select a subset of the data streams with a higher number ACKs among the monitored streams. The receiver may then perform the ACK coalescing on the subset of data streams with the relatively higher number ACKs.

In some aspects, through 502, 504, 506, and 508, the receiver may perform the ACK coalescing based on the current configuration for a first time period of T1. At 502, the receiver may initiate a first timer for T1 time period. While the T1 timer lapses (e.g., before an expiration of the first timer), the receiver may receive a plurality of data streams from a transmitter. Here, each data stream of the plurality of data streams may be active data streams including at least one data stream.

At 504, the receiver may perform the ACK coalescing. Here, the ACK coalescing may be based on the current configuration. In one example, the current configuration of the ACK coalescing may be the first-come-first-served, and the receiver may perform the ACK coalescing based on the first-come-first-served. Here, the first-come-first-served basis may refer to processing the ACK coalescing based on an order of ACK generation. In another example, the current configuration of the ACK coalescing may include a coalescing list of data streams to perform the ACK coalescing, and the receiver may perform the ACK coalescing for the data streams associated with the coalescing list. At 506, the receiver may check whether the T1 timer has expired. Until the T1 timer expires, the receiver may perform the ACK coalescing based on the current configuration.

At 508, the receiver may check whether the number of the active streams is smaller than or equal to n, where n may refer to the maximum number of data streams configured for the receiver to perform the ACK coalescing. That is, in response to the expiration of the T1 timer, the receiver may check whether the number of the active streams is within the maximum number of data streams configured for the ACK coalescing. In response to determining that the number of the active streams is within the maximum number of data streams configured for the ACK coalescing, the receiver may return to 502 and start the T1 timer.

In response to determining that the number of the active streams is greater than the maximum number of data streams configured for the ACK coalescing, the receiver may rank the active data streams received from the transmitter and select a coalescing list of active streams on which the receiver will perform the ACK coalescing. Through 510, 512, 514, and 516, the receiver may rank the active data streams received from the transmitter based on an estimated number of ACKs for the subsequent period, and select the coalescing list of the active streams for the receiver to perform the ACK coalescing based on the estimated number of ACKs for the subsequent period. The receiver may perform the ACK coalescing for the subsequent T1 timer duration. That is, in response to the number of active data streams before the expiration of the T1 timer being greater than the threshold number of data streams, the receiver may obtain a list of a subset of data streams from the plurality of data streams received from the transmitter as the coalescing list, the list of subset of data streams determined based at least on each number of acknowledgements (ACK) generated for each active data stream.

At 510, the receiver may initiate a second timer (e.g., T2 timer) based on a number of data streams of the plurality of data streams received before the expiration of the T1 timer being greater than a threshold number of data streams (e.g., the maximum number of data streams configured for the ACK coalescing).

At 512, the receiver may sample the active streams and calculate the ranks of the active streams. That is, the receiver may determine a metric of the active streams based on the number of ACKs generated for each data stream of the plurality of data streams before the expiration of the T2 timer. The receiver may monitor and count the number of ACKs generated by each data stream of the plurality of data streams received from the network node until the T2 timer timer expires. The receiver may calculate the ranks of the active streams based on the metric of the sampled active streams. That is, the receiver may calculate the ranks of the active streams based at least on the metric associated with the number of the ACKs generated by each data stream of the plurality of data streams. For example, the metric of each active stream may include the number of ACKs generated by each data stream, an average of the number of ACKs generated by each active stream, or a standard deviation of the number of ACKs generated by each active stream. At 514, the receiver may determine whether the T2 timer has expired. Until the T2 timer expires, the receiver may sample the ACK coalescing based on the current configuration.

At 516, the receiver may check the top n streams and update the rules for the ACK coalescing. Here, n may refer to the maximum number of data streams configured for the receiver to perform the ACK coalescing. That is, the receiver may generate the coalescing list including the subset of data streams of the plurality of data streams based the metric of each data stream based on the number of ACK sampled for each data stream. Based on the coalescing list, the receiver may be configured to return to 502 to perform the ACK coalescing for the subsequent T1 time period.

Figure 6:
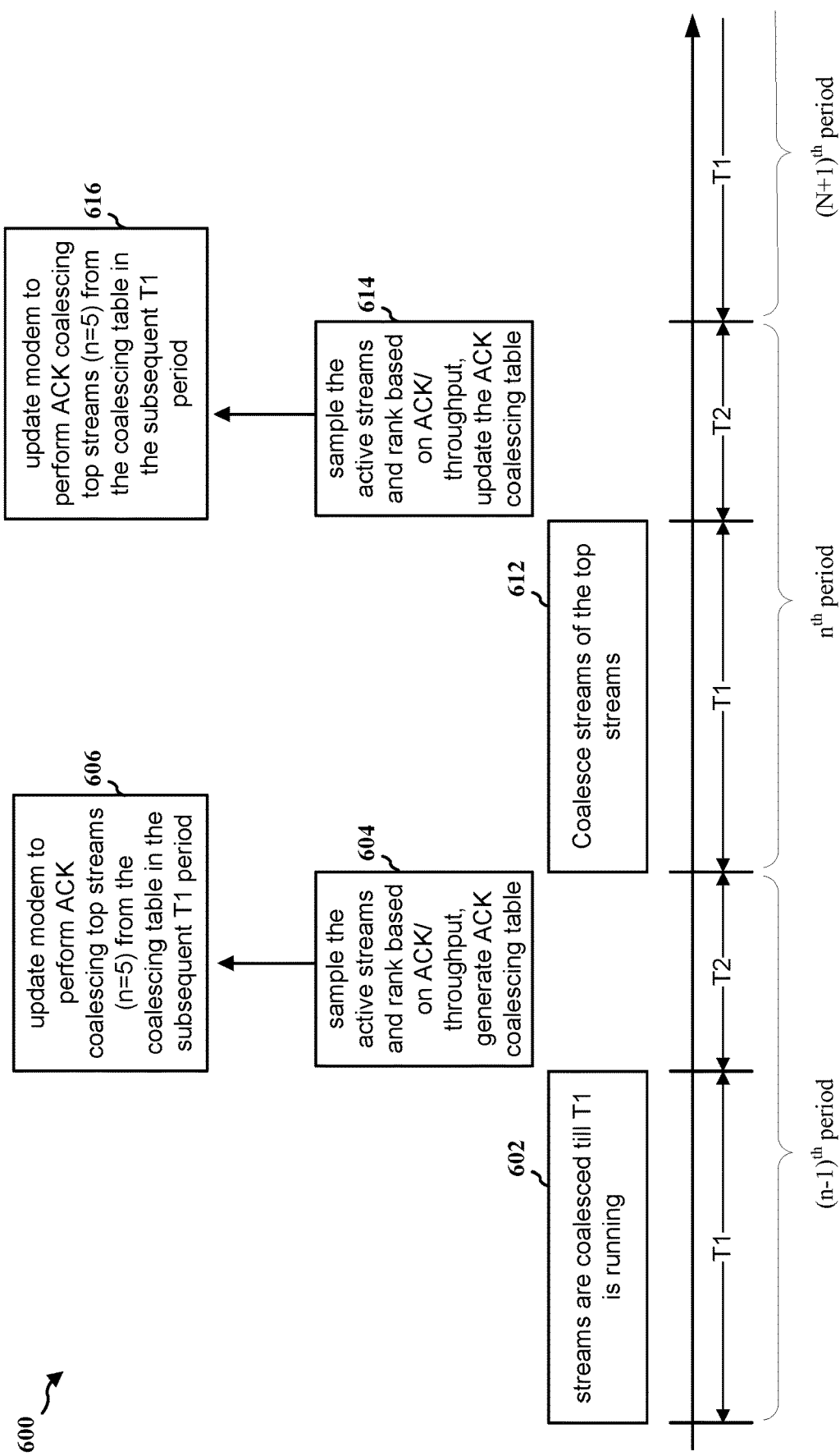
FIG. 6 is a diagram illustrating an example of an ACK coalescing.

FIG. 6 is a diagram 600 illustrating an example of an ACK coalescing. The algorithm of the diagram 600 may be performed by a receiver. The diagram 600 may illustrate the algorithm of actively tracking every data stream for the number of ACKs generated by each data stream, and perform the ACK coalescing for the data stream (or a number of data streams) which may be responsible for a relatively higher number of ACKs. The diagram 600 may include a T1 time duration and a T2 time duration. The receiver may perform the ACK coalescing based on a coalescing table (or a coalescing list) during the T1 time duration, and generate or update the coalescing table based on the sampled metric of the active streams during the T2 time duration.

At 602, during the first T1 time duration, the receiver may first perform the ACK coalescing based on a current ACK coalescing configuration. In one example, the current configuration of the ACK coalescing may be the first-come-first-served, and the receiver may perform the ACK coalescing based on the first-come-first-served. In another example, the current configuration of the ACK coalescing may include a coalescing list of data streams to perform the ACK coalescing, and the receiver may perform the ACK coalescing for the data streams associated with the coalescing list. Here, the coalescing list of data streams may had been generated or updated by the receiver during a previous T2 time period before the T1 time duration of 602. That is, the T1 time duration associated with 602 and the T2 time duration associated with 604 may be $(n-1)^{th}$ period, and the ACK coalescing of 602 during the T1 period may be based on a subset of active streams with the top ranks from the coalescing table from the T2 period of the $(n-2)^{th}$ period.

At 604, during the T2 time duration, the receiver may sample the active streams, generate the ranks of the active streams based on the numbers of the ACK, and generate the ACK coalescing table. At 606, based on the ACK coalescing table of 604, the receiver may update modem to coalesce top streams from the coalescing table in the subsequent T1 period. That is, the receiver may update the list of a subset of active streams to perform the ACK coalescing. The number of streams in the subset of active streams to perform the ACK coalescing may be based on the maximum number of data streams configured for the ACK coalescing. Here, the maximum number of data streams configured for the ACK coalescing may be five (5) and the receiver may instruct the modem to perform the ACK coalescing to the subset of active streams including the five (5) active streams with the top five (5) ranks. Based on the list of the subset of active streams to perform the ACK coalescing, the receiver may perform the ACK coalescing to the subset of active streams during the subsequent T1 period. Here, the T1 time duration associated with 602 and the T2 time duration associated with 604 may be $(n-1)^{th}$ period, and the subsequent T1 period may be the T1 period of the $n^{th}$ period.

For example, during the T2 time duration of the $(n-1)^{th}$ period, the receiver may receive six (6) active streams, and the receiver may sample the six (6) active streams to determine the respective rank of the six (6) active streams. Table 3 illustrates the coalescing table including the six (6) active streams and the associated ranks. According to Table 3, the six (6) active streams are ranked in the order of a stream 2, a stream 4, a stream 1, a stream 5, a stream 3, and a stream 6. In case the maximum number of data streams configured for the ACK coalescing being five (5), the receiver may select the five (5) streams with the top ranks from the coalescing table.

TABLE 3

| | coalescing table | |
|---|---|---|
| stream ID/Rank | Sorted stream ID/Rank | Status |
| 1/3 | 2/1 | active |
| 2/1 | 4/2 | active |
| 3/5 | 1/3 | active |
| 4/2 | 5/4 | active |
| 5/4 | 3/5 | active |
| 6/6 | 6/6 | active |

Accordingly, the subset of active streams may include the stream 2, the stream 4, the stream 1, the stream 5, and the stream 3, and the receiver may select the stream 2, the stream 4, the stream 1, the stream 5, and the stream 3 in the T1 time duration of the $n^{th}$ period. Based on Table 3, the receiver may determine not to perform the ACK coalescing to the stream 6.

At 612, during the T1 time duration of the $n^{th}$ period, the receiver may perform the ACK coalescing based on the ACK coalescing configuration from a T2 time duration of the previous period. Here, during the T1 time duration of the $n^{th}$ period, the receiver may perform the ACK coalescing based on the ACK coalescing configuration from the T2 time duration of the $(n-1)^{th}$ period. For example, based on the subset of active streams including the stream 2, the stream 4, the stream 1, the stream 5, and the stream 3 from the $(n-1)^{th}$ period, the receiver may perform the ACK coalescing to the subset of active streams including the stream 2, the stream 4, the stream 1, the stream 5, and the stream 3.

At 614, during the T2 time duration of the $n^{th}$ period, the receiver may sample the active streams, generate the ranks of the active streams based on the numbers of the ACK, and generate the updated ACK coalescing table. At 616, based on the ACK coalescing table of 614, the receiver may update modem to coalesce top streams from the coalescing table in the subsequent T1 period. That is, the receiver may update the list of the subset of active streams to perform the ACK coalescing. The number of streams in the subset of active streams to perform the ACK coalescing may be based on the maximum number of data streams configured for the ACK coalescing. Here, the maximum number of data streams configured for the ACK coalescing may be five (5) and the receiver may instruct the modem to perform the ACK coalescing to the subset of active streams including the five (5) active streams with the top five (5) ranks. Based on the list of the subset of active streams to perform the ACK coalescing, the receiver may perform the ACK coalescing to the subset of active streams during the subsequent T1 period. Here, the T1 time duration associated with 602 and the T2 time duration associated with 604 may be $n^{th}$ period, and the subsequent T1 period may be the T1 period of the $(n-1)^{th}$ period.

For example, during the T2 time duration of the $n^{th}$ period, the receiver may receive seven (7) active streams, and the receiver may sample the seven (7) active streams to determine the respective rank of the seven (7) active streams. Table 4 illustrates the coalescing table including the six (7) active streams and the associated ranks. According to Table 3, the seven (7) active streams are ranked in the order of the stream 2, the stream 6, the stream 1, the stream 5, the stream 3, the stream 7, and the stream 4. Because the maximum number of data streams configured for the ACK coalescing is five (5), the receiver may select the five (5) streams with the top ranks from the coalescing table.

TABLE 4 coalescing table

| stream ID/Rank | Sorted stream ID/Rank | Status |
| --- | --- | --- |
| 1/3 | 2/1 | active |
| 2/1 | 6/2 | active |
| 3/5 | 1/3 | active |
| 4/7 | 5/4 | active |
| 5/4 | 3/5 | active |
| 6/2 | 7/6 | active |
| 7/6 | 4/7 | active |

Accordingly, the subset of active streams may be updated to include the stream 2, the stream 6, the stream 1, the stream 5, and the stream 3, and the receiver may perform the ACK coalescing to the stream 2, the stream 6, the stream 1, the stream 5, and the stream 3 during the T1 time duration of the $(n+1)^{th}$ period. Based on Table 4, the receiver may determine not to perform the ACK coalescing to the stream 7 and the stream 4.

Based on the algorithms illustrated in flow chart 500 and diagram 600, the receiver may select the active streams for ACK coalescing not be based on the data throughput carried by the active streams. Based on the aspects of the current disclosure, the receiver selecting the active streams for ACK coalescing, the receiver may reduce the number of ACKs that may be sent based on the number of ACKs of each streams reaching the peak numbers. Also, the receiver may prioritize the RNDIS DL streams over the embedded DL streams for the purpose of ACK coalescing based on the RNDIS DL streams having a greater number of ACKs than the embedded DL streams with the same throughput.

In some aspects, the rank function may incorporate at least one of a current average of the number of ACKs or a standard deviation of the number of ACKs generated by the active streams. In one example, the receiver may consider the average number of ACKs on the current period to consider the number of ACKs from the previous periods. In another example, the receiver may consider the standard deviation of the number ACKs generated by the number of ACKs to reduce unnecessary update of the subset of the active streams to perform the ACK coalescing.

In one aspect, the average number of the ACKs generated by the active streams may be used to find out the current ranks of the active streams. That is, the ranks of the active streams may be determined based on the average number of the ACKs generated by the active steams during the current period (e.g., the $n^{th}$ period) based on the numbers of ACKs generated by the active steams during the current period (e.g., the $n^{th}$ period) and at least one previous period (e.g., the $(n-1)^{th}$ period, $(n-2)^{th}$ period, $(n-3)^{th}$ period, etc.). Here, the average number of the ACKs generated by the active streams may be considered as the estimated number of ACKs for the subsequent period (e.g., the $(n+1)^{th}$ period).

In one example, the estimated number of ACKs of the active stream may be generated as $(w1 \times ACK(n)) + (w2 \times ACK(n-1)) + \ldots (wm*ACK(n-m))$, where ACK(n), ACK(n-1), ACK(n-m) may represent the number of ACKs to calculated in the T2 time duration of the $n^{th}$, $(n-1)^{th}$, ..., $(n-m)^{th}$ periods, and w1, w2, ..., wm may represent a set of weights assigned to the number of ACKs calculated in the T2 time duration of the $n^{th}$, $(n-1)^{th}$, ..., $(n-m)^{th}$ period. In one example, the set of weights may be configured to satisfy $w1+w2+\ldots+wm=1$. In another example, the set of weights may be configured so to satisfy $w1>w2>\ldots>wm$.

Based on the estimated number of ACKs to be generated by the active streams, the receiver may determine the ranks of the plurality of active streams. That is, during the T2 time duration of the $n^{th}$ period, the receiver may determine the estimated number of ACKs that each active stream of the plurality of streams may generated in the $(n+1)^{th}$ period, and assign ranks for each active stream of the plurality of streams based on the estimated number of ACKs to be generated in the $(n+1)^{th}$ period.

In one aspect, the receiver may use a static approach, and the set of weights to be applied to the numbers of ACKs calculated in the T2 time duration of the current period (e.g., the $n^{th}$ period) and the previous periods (e.g., the (n−1)th, ..., the $(n-m)^{th}$ periods), the set of weights may be configured for the receiver. In one example, the default values of the set of weights may be determined configured for the receiver (e.g., based on lab experiments).

In another aspect, the receiver may use a dynamic approach, and start from an initiation matrix of set of weights and use an ANN (Artificial Neural Network) to find the proper set of weights to be applied for the numbers of ACKs calculated in the T2 time duration of the current period (e.g., the $n^{th}$ period) and the previous periods (e.g., the $(n-1)^{th}$, ..., the $(n-m)^{th}$ periods). The set of weights may be updated in every iteration as per output of the ANN until achieving the weight that may generate a target efficiency of the network. Here, the target efficiency of the network may refer to the ACK coalescing efficiency.

In some aspects described herein, an encoding device (e.g., the receiver, the transmitter, or a UE) may train one or more neural networks to learn dependence of measured qualities on individual parameters. Among others, examples of machine learning models or neural networks that may be comprised in the UE and/or network entity include an artificial neural network (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as the ANN, may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

In one aspect, the ANN may be used to determine the proper set of weights for determining the estimated number of ACKs of the active stream in the subsequent period (e.g., the ACK(n+1)) based on the numbers of ACKs generated by the active steams during the current period (e.g., the $n^{th}$ period) and at least one previous period (e.g., the $(n-1)^{th}$ period, $(n-2)^{th}$ period, $(n-3)^{th}$ period, etc.). In one example, the ANN may be included in the receiver, and the receiver may perform the sliding window based ANN to determine the proper set of weights for determining the estimated number of ACKs of the active stream in the subsequent period. In another example, the ANN may be included in the transmitter, and the transmitter may perform the sliding window based ANN to determine the proper set of weights for determining the estimated number of ACKs of the active stream in the subsequent period.

Here, the sliding window may refer to a temporary approximation over the actual value of the time series data. Accordingly, the ANN may start from the initiation matrix of set of weights, and move (or slide) the approximation of the set of weights based on the series of the numbers of ACKs generated by the active steams during the current period (e.g., the $n^{th}$ period) and at least one previous period (e.g., the $(n-1)^{th}$ period, $(n-2)^{th}$ period, $(n-3)^{th}$ period, etc.). In one example, the sliding window based ANN may apply a first-order iterative optimization algorithm (e.g., a gradient decent) to find a local minimum of a differentiable function generated based on the numbers of ACKs generated by the active steams during the current period (e.g., the $n^{th}$ period) and at least one previous period (e.g., the $(n-1)^{th}$ period, $(n-2)^{th}$ period, $(n-3)^{th}$ period, etc.) to find the estimated number of ACKs of the active stream in the subsequent period (e.g., the ACK(n+1)) without overfitting.

In some aspects, during the T2 time duration of the $n^{th}$ period, the rank of each active streams may be determined based on the estimated number of ACKs of the active stream in the subsequent period. That is, the estimated number of ACKs of the active stream in the subsequent period (e.g., the $(n+1)^{th}$ period) may be determined based on the numbers of ACKs generated by the active steams during the current period (e.g., the $n^{th}$ period) and at least one previous period (e.g., the $(n-1)^{th}$ period, $(n-2)^{th}$ period, $(n-3)^{th}$ period, etc.), and the ranks of the active streams at the $n^{th}$ period may be determined based on the estimated number of ACKs of the active streams in the subsequent period (e.g., the $(n+1)^{th}$ period). Based on the ranks of the active streams at the $n^{th}$ period, the active streams may be sorted to generate or update the coalescing list including a subset of active streams with the top ranks. The receiver of the plurality of active streams may be configured to perform the ACK coalescing to the subset of active streams with the top ranks in the coalescing list.

In one aspect, the receiver of the plurality of active streams the coalescing list including the subset of active streams may be updated based on at least one threshold value. Here, the threshold value may be a hysteresis parameter (e.g., $\Delta ACK$). That is, at least one threshold value may be configured for the receiver, and the receiver may update the coalescing list by including a new active stream in place of an active stream with the lowest rank in the coalescing list based on a first number of estimated ACKs of the new active stream being greater than a second number of estimated ACKs of the active stream with the lowest rank in the coalescing list by the threshold value. For example, in case the maximum number of TCP streams configured for the ACK coalescing being 20, the coalescing list may include the subset of active streams of 20 active streams with the 20 top ranks from the plurality of active streams received at the receiver, with a first active stream ranked at $20^{th}$ and a second active stream ranked at $21^{st}$. During the T2 time duration of the $n^{th}$ period, if the receiver determines that a first estimated number of ACKs of the first active stream at the $n^{th}$ period smaller than a second estimated number of ACKs of the second active stream at the $n^{th}$ period, the first active stream may replace the second active stream based on the first estimated number of ACKs of the first active stream being greater than the second estimated number of ACKS by the threshold value. Based on the threshold value, the receiver may reduce unnecessary switching of the active streams in the subset of active streams.

Figure 7:
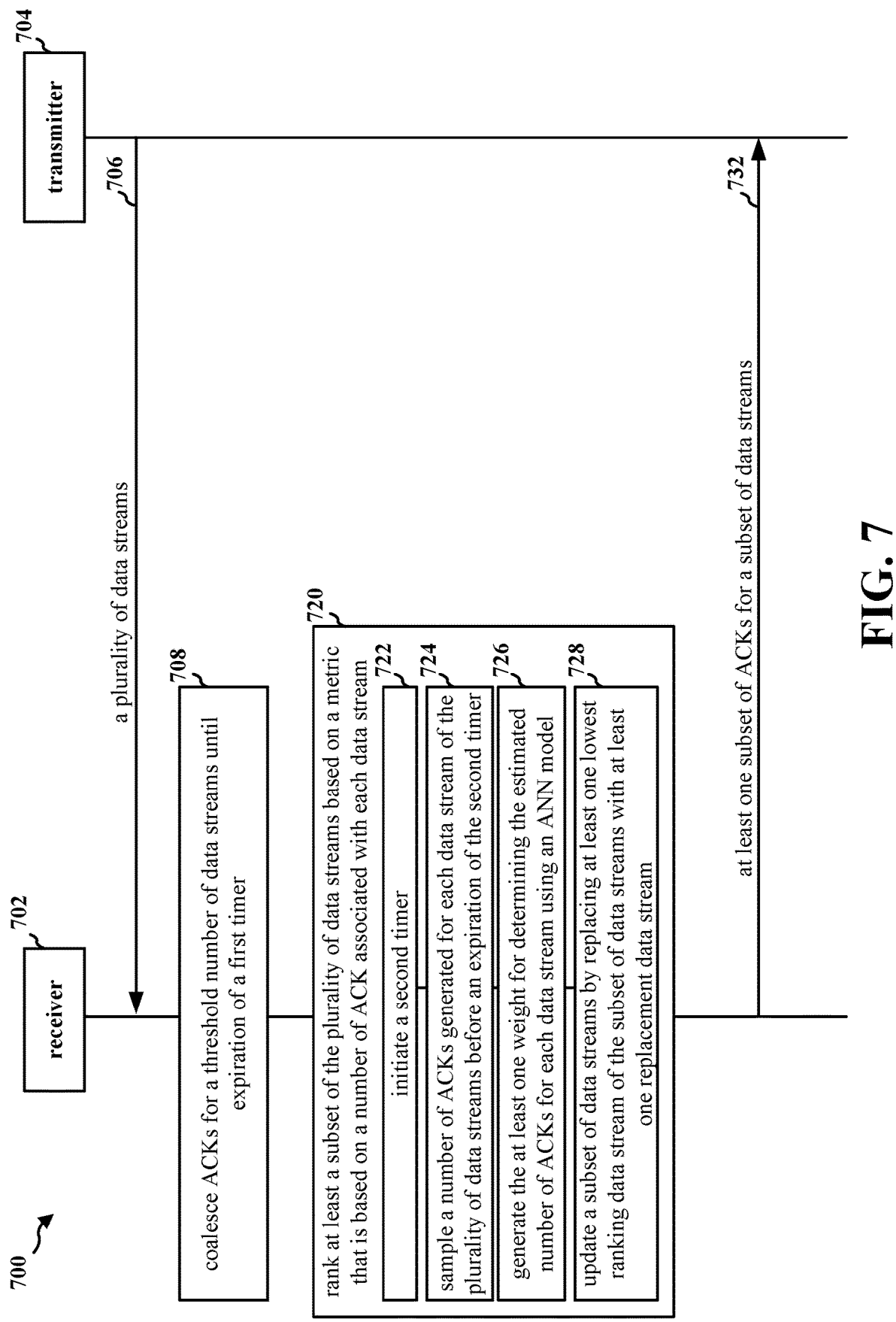
FIG. 7 is a call-flow diagram of a method of wireless communication.

FIG. 7 is a call-flow diagram 700 of a method of wireless communication. The call-flow diagram 700 may include a receiver 702 and a transmitter 704. Here, the receiver 702 may be a UE, and the transmitter 704 may be the network node. The receiver 702 may receive a plurality of data streams including at least one data stream from a transmitter 704, rank at least a subset of the plurality of data streams based on a metric that is based on a number of ACK associated with each data stream, and perform an ACK coalescing on the subset of the plurality of data streams based on the associated ranks. The rank of each data stream may be determined using a set of weights applied to at least one metric of the data stream. The set of weights may be static or dynamic. The transmitter 704 may receive the ACKs based on the ACK coalescing.

At 706, the transmitter 704 may transmit a plurality of data streams to a receiver 702, each data stream of the plurality of data streams including at least one data stream. The receiver 702 may receive a plurality of data streams from a transmitter 704, each data stream of the plurality of data streams including at least one data stream.

At 708, the receiver 702 may coalesce ACKs for a threshold number of data streams in response to expiration of a first timer. Here, the receiver 702 may start a first timer, and receive the plurality of data streams. The receiver 702 may coalesce the ACKs generated in response to the plurality of data streams until the expiration of the first timer (e.g., T1 timer). Here, the receiver 702 may be configured with a maximum number of data streams configured for the receiver 702 to perform the ACK coalescing, and if the number of the data streams exceeds the maximum number of data streams configured for the ACK coalescing, the receiver 702 may perform the ACK coalescing to a subset of data streams including the maximum number of data streams configured for the ACK coalescing.

In some aspects, the receiver 702 may perform the ACK coalescing based on the current configuration for a first time period of T1 (e.g., the T1 timer). The current configuration may be based on a first-come-first-served basis or based on a coalescing list of data streams to perform the ACK coalescing from a previous period. In one aspect, the receiver 702 may coalesce ACKs for a threshold number of data streams based on an order of ACK generation prior to an expiration of a first timer. That is, the receiver 702 may be configured to perform the ACK coalescing based on the first-come-first-served rule, and the receiver 702 may perform the ACK coalescing based on an order of ACK generation. In another aspect, the receiver 702 may coalesce ACKs for a threshold number of data streams based on a coalescing list of data streams to perform the ACK coalescing from a previous period. That is, the receiver 702 may have a coalescing list of data streams to perform the ACK coalescing from the previous period, and the receiver 702 may perform the ACK coalescing to the threshold number of data streams associated with the coalescing list from the previous period.

Upon expiration of the first timer (e.g., the T1 timer), the receiver 702 may check whether the number of the active streams is smaller than or equal to n, where n may refer to the threshold number of data streams, which is the maximum number of data streams configured for the receiver 702 to perform the ACK coalescing. If the receiver 702 determines that the number of the active streams is within the threshold number of streams, the receiver 702 may repeat 708 to perform the coalesce ACKs for the threshold number of data streams until expiration of the first timer. If the receiver 702 determines that the number of the active streams is greater than the threshold number of streams, the receiver 702 may start a second timer (e.g., the T2 timer) and rank at least a subset of data streams to generated or update the coalescing list.

At 720, the receiver 702 may rank at least a subset of the plurality of data streams based on a metric that is based on a number of ACK associated with each data stream. That is, the receiver 702 may rank the active data streams received from the transmitter 704 and select a coalescing list of active streams to perform the ACK coalescing. The receiver 702 may estimate a number of ACKs in the subsequent period for each active data streams, and rank the active data streams received from the transmitter 704 during the second timer based on the estimated number of ACKs for the subsequent period. The receiver 702 may select the coalescing list of the active streams for the receiver 702 to perform the ACK coalescing based on the estimated number of ACKs in the subsequent period. Here, 720 may include 722, 724, 726, and 728.

In one aspect, the rank of at least the subset of the plurality of data streams may be generated based at least in part on an estimated number of ACKs for each data stream of the plurality of data streams. Here, in case the second timer is within $n^{th}$ period, the receiver 702 may estimate the number of ACKs for each data stream of the plurality of data streams in the $(n+1)^{th}$ period. The estimated number of ACKs for each data stream may be generated based on an average number of ACKs based on a current number of ACKs generated for each data stream and at least one previous number of ACKs generated for each data stream. Here, the estimated number of ACKs of the active stream may be generated as (w1×ACK(n))+(w2×ACK(n−1))+(wm*ACK(n−m)), where ACK(n), ACK(n−1), ACK(n−m) may represent the number of ACKs to calculated in the T2 time duration of the $n^{th}$, $(n−1)^{th}$, $(n−m)^{th}$ periods, and w1, w2, wm may represent a set of weights assigned to the number of ACKs calculated in the T2 time duration of the $n^{th}$, $(n−1)^{th}$, . . . , $(n−m)^{th}$ period. In one example, the set of weights may be configured to satisfy w1+w2++wm=1. In another example, the set of weights may be configured so to satisfy w1>w2>>wm.

At 722, the receiver 702 may initiate a second timer (e.g., the T2 timer) based on a number of data streams of the plurality of data streams received before the expiration of the first timer being greater than a threshold number of data streams. During the T2 timer lapses, the receiver 702 may sample the active streams and calculate the ranks of the active streams to determine coalescing list of data streams to perform the ACK coalescing.

At 724, the receiver 702 may sample a number of ACKs generated for each data stream of the plurality of data streams before an expiration of the second timer, where the rank is based on the number of ACKs sampled for each data stream.

For example, the set of weights (w1, w2, w3, . . . , wm) for determining the estimated number of ACKs for each data stream may be determined using an ANN model. At 726, the receiver 702 may generate the at least one weight for determining the estimated number of ACKs for each data stream using the ANN model, an input of the ANN model including at least a current number of ACKs generated for each data stream and at least one previous number of ACKs generated for each data stream. Here, the ANN model may be the sliding window based ANN model.

In another aspect, the rank for at least the subset of the plurality of data streams may be generated based at least in part on a deviation of the number of ACKs for each data stream of the plurality of data streams, where the deviation of the number of ACKs for each data stream may be based on a current number of ACKs generated for each data stream and at least one previous number of ACKs generated for each data stream.

At 728, the receiver 702 may update a subset of data streams by replacing at least one lowest rank data stream of the subset of data streams with at least one replacement data stream other than the subset of data streams. The at least one replacement data stream may have a first metric greater than a second metric of the at least one lowest rank data stream.

In one aspect, the subset of data streams may be updated based on the first metric being greater than the second metric by a threshold value. That is, the receiver 702 may update the list of subset of data streams by replacing at least one lowest rank data stream of the subset of data streams with at least one replacement data stream other than the subset of data streams based on the at least one replacement data stream having a first metric greater than a second metric of the at least one lowest rank data stream by the threshold value. For example, the threshold value may be configured for the receiver 702.

At 732, the receiver 702 may transmit at least one subset of ACKs for the subset of data streams, where each subset of ACKs of the at least one subset of ACKs indicates a plurality of ACKs for a subset of packets of the subset of data streams. The transmitter 704 may receive at least one subset of ACKs for the subset of data streams, where each subset of ACKs of the at least one subset of ACKs indicates a plurality of ACKs for a subset of packets of the subset of data streams, and each data stream of the subset of the data streams being associated with a rank based on a number of ACKs associated with each data stream.

Figure 8:
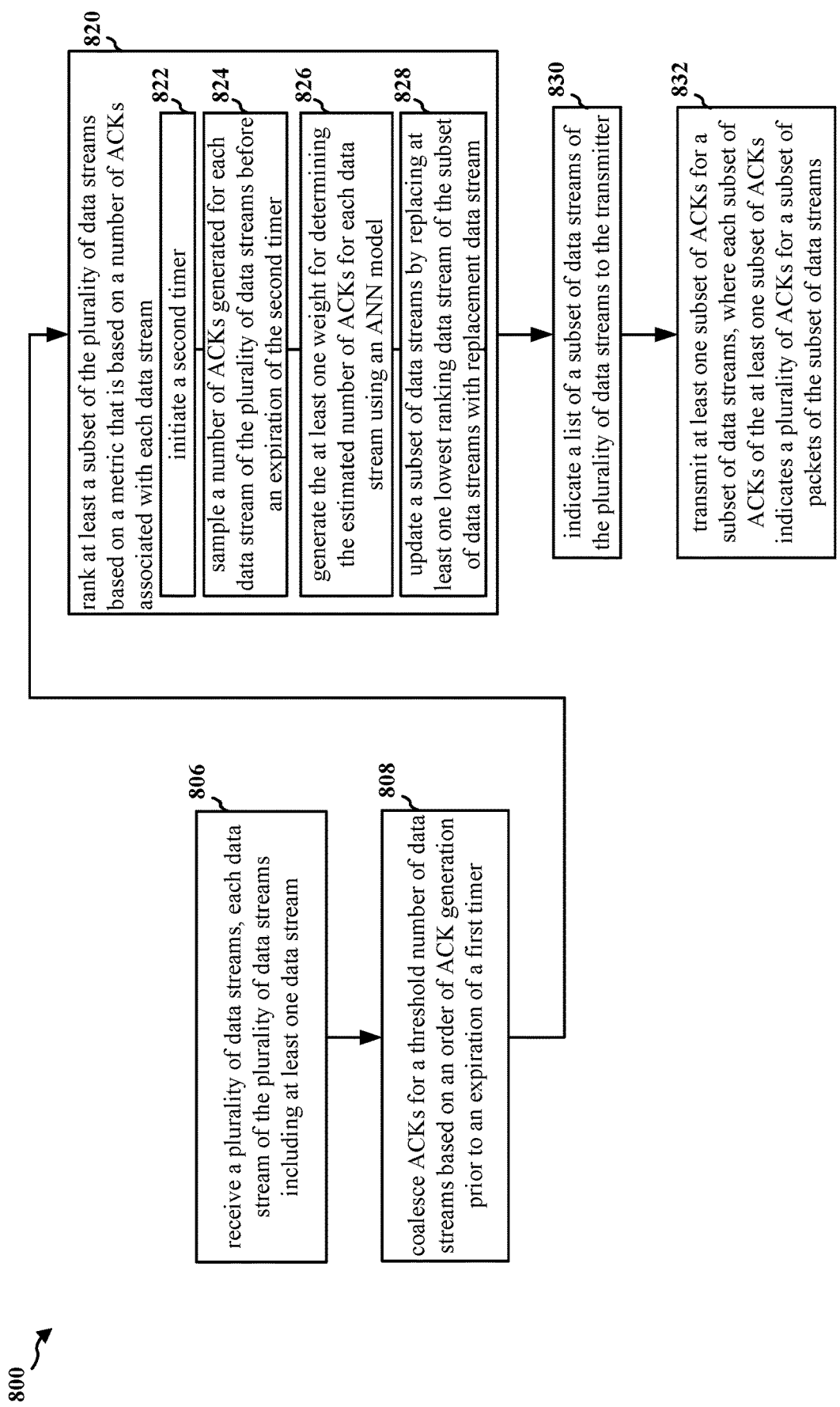
FIG. 8 is a flowchart of a method of wireless communication.

FIG. 8 is a flowchart 800 of a method of wireless communication. The method may be performed by a receiver (e.g., the UE 104; the receiver 702; the apparatus 1104). Here, the receiver may be a UE. The receiver may receive a plurality of data streams including at least one data stream from a transmitter, rank at least a subset of the plurality of data streams based on a metric that is based on a number of ACK associated with each data stream, and perform an ACK coalescing on the subset of the plurality of data streams based on the associated ranks. The rank of each data stream may be determined using a set of weights applied to at least one metric of the data stream. The set of weights may be static or dynamic.

At 806, the receiver may receive a plurality of data streams from a transmitter, each data stream of the plurality of data streams including at least one data stream. For example, at 706, the receiver 702 may receive a plurality of data streams from a transmitter 704, each data stream of the plurality of data streams including at least one data stream. Furthermore, 806 may be performed by an ACK coalescing component 198.

At 808, the receiver may coalesce ACKs for a threshold number of data streams in response to expiration of a first timer. Here, the receiver may start a first timer, and receive the plurality of data streams. The receiver may coalesce the ACKs generated in response to the plurality of data streams until the expiration of the first timer (e.g., T1 timer). Here, the receiver may be configured with a maximum number of data streams configured for the receiver to perform the ACK coalescing, and if the number of the data streams exceeds the maximum number of data streams configured for the ACK coalescing, the receiver may perform the ACK coalescing to a subset of data streams including the maximum number of data streams configured for the ACK coalescing. For example, at 708, the receiver 702 may coalesce ACKs for a threshold number of data streams in response to expiration of a first timer. Furthermore, 808 may be performed by the ACK coalescing component 198.

In some aspects, the receiver may perform the ACK coalescing based on the current configuration for a first time period of T1 (e.g., the T1 timer). The current configuration may be based on a first-come-first-served basis or based on a coalescing list of data streams to perform the ACK coalescing from a previous period. In one aspect, the receiver may coalesce ACKs for a threshold number of data streams based on an order of ACK generation prior to an expiration of a first timer. That is, the receiver may be configured to perform the ACK coalescing based on the first-come-first-served rule, and the receiver may perform the ACK coalescing based on an order of ACK generation. In another aspect, the receiver may coalesce ACKs for a threshold number of data streams based on a coalescing list of data streams to perform the ACK coalescing from a previous period. That is, the receiver may have a coalescing list of data streams to perform the ACK coalescing from the previous period, and the receiver may perform the ACK coalescing to the threshold number of data streams associated with the coalescing list from the previous period.

Upon expiration of the first timer (e.g., the T1 timer), the receiver may check whether the number of the active streams is smaller than or equal to n, where n may refer to the threshold number of data streams, which is the maximum number of data streams configured for the receiver to perform the ACK coalescing. If the receiver determines that the number of the active streams is within the threshold number of streams, the receiver may repeat 708 to perform the coalesce ACKs for the threshold number of data streams until expiration of the first timer. If the receiver determines that the number of the active streams is greater than the threshold number of streams, the receiver may start a second timer (e.g., the T2 timer) and rank at least a subset of data streams to generated or update the coalescing list.

At 820, the receiver may rank at least a subset of the plurality of data streams based on a metric that is based on a number of ACK associated with each data stream. That is, the receiver may rank the active data streams received from the transmitter and select a coalescing list of active streams to perform the ACK coalescing. The receiver may estimate a number of ACKs in the subsequent period for each active data streams, and rank the active data streams received from the transmitter during the second timer based on the estimated number of ACKs for the subsequent period. The receiver may select the coalescing list of the active streams for the receiver to perform the ACK coalescing based on the estimated number of ACKs in the subsequent period. For example, at 720, the receiver 702 may rank at least a subset of the plurality of data streams based on a metric that is based on a number of ACK associated with each data stream. Furthermore, 820 may be performed by the ACK coalescing component 198. 820 may include 822, 824, 826, and 828.

At 822, the receiver may initiate a second timer (e.g., the T2 timer) based on a number of data streams of the plurality of data streams received before the expiration of the first timer being greater than a threshold number of data streams. During the T2 timer lapses, the receiver may sample the active streams and calculate the ranks of the active streams to determine coalescing list of data streams to perform the ACK coalescing. For example, at 722, the receiver 702 may initiate a second timer (e.g., the T2 timer) based on a number of data streams of the plurality of data streams received before the expiration of the first timer being greater than a threshold number of data streams. Furthermore, 822 may be performed by the ACK coalescing component 198.

At 824, the receiver may sample a number of ACKs generated for each data stream of the plurality of data streams before an expiration of the second timer, where the rank is based on the number of ACKs sampled for each data stream. For example, at 724, the receiver 702 may sample a number of ACKs generated for each data stream of the plurality of data streams before an expiration of the second timer, where the rank is based on the number of ACKs sampled for each data stream. Furthermore, 824 may be performed by the ACK coalescing component 198.

For example, the set of weights (w1, w2, w3, wm) for determining the estimated number of ACKs for each data stream may be determined using an ANN model. At 826, the receiver may generate the at least one weight for determining the estimated number of ACKs for each data stream using the ANN model, an input of the ANN model including at least a current number of ACKs generated for each data stream and at least one previous number of ACKs generated for each data stream. Here, the ANN model may be the sliding window based ANN model. For example, at 726, the receiver 702 may generate the at least one weight for determining the estimated number of ACKs for each data stream using the ANN model, an input of the ANN model including at least a current number of ACKs generated for each data stream and at least one previous number of ACKs generated for each data stream. Furthermore, 826 may be performed by the ACK coalescing component 198.

In another aspect, the rank for at least the subset of the plurality of data streams may be generated based at least in part on a deviation of the number of ACKs for each data stream of the plurality of data streams, where the deviation of the number of ACKs for each data stream may be based on a current number of ACKs generated for each data stream and at least one previous number of ACKs generated for each data stream.

At 828, the receiver may update a subset of data streams by replacing at least one lowest rank data stream of the subset of data streams with at least one replacement data stream other than the subset of data streams. The at least one replacement data stream may have a first metric greater than a second metric of the at least one lowest rank data stream. For example, at 728, the receiver 702 may update a subset of data streams by replacing at least one lowest rank data stream of the subset of data streams with at least one replacement data stream other than the subset of data streams. Furthermore, 828 may be performed by the ACK coalescing component 198.

In one aspect, the subset of data streams may be updated based on the first metric being greater than the second metric by a threshold value. That is, the receiver may update the list of subset of data streams by replacing at least one lowest rank data stream of the subset of data streams with at least one replacement data stream other than the subset of data streams based on the at least one replacement data stream having a first metric greater than a second metric of the at least one lowest rank data stream by the threshold value. For example, the threshold value may be configured for the receiver.

At 830, the receiver may indicate a list of a subset of data streams of the plurality of data streams to the transmitter.

At 832, the receiver may transmit at least one subset of ACKs for the subset of data streams, where each subset of ACKs of the at least one subset of ACKs indicates a plurality of ACKs for a subset of packets of the subset of data streams. For example, at 732, the receiver 702 may transmit at least one subset of ACKs for the subset of data streams, where each subset of ACKs of the at least one subset of ACKs indicates a plurality of ACKs for a subset of packets of the subset of data streams. Furthermore, 832 may be performed by the ACK coalescing component 198.

Figure 9:
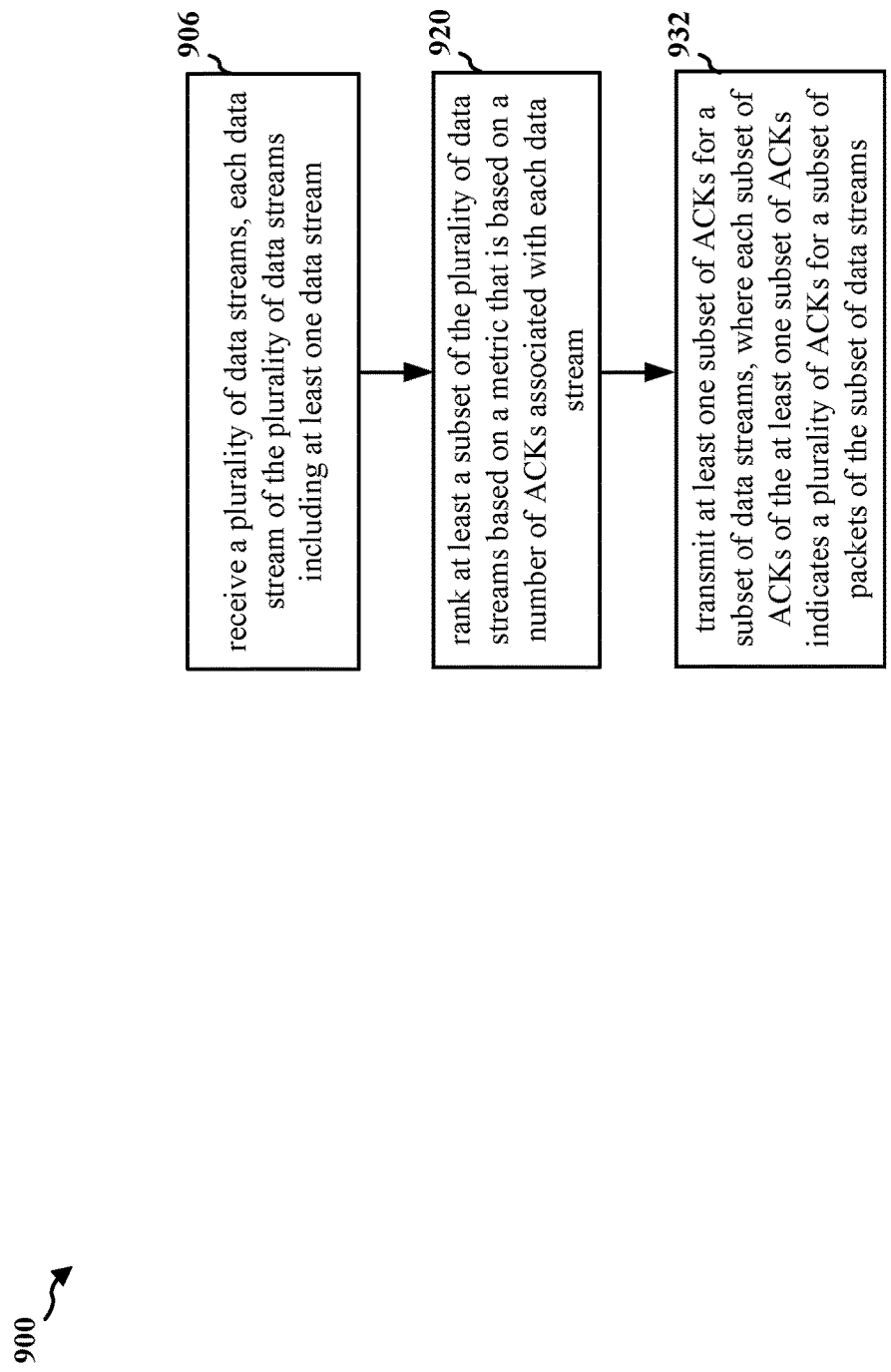
FIG. 9 is a flowchart of a method of wireless communication.

FIG. 9 is a flowchart 900 of a method of wireless communication. The method may be performed by a receiver (e.g., the UE 104; the receiver 702; the apparatus 1104). Here, the receiver may be a UE. The receiver may receive a plurality of data streams including at least one data stream from a transmitter, rank at least a subset of the plurality of data streams based on a metric that is based on a number of ACK associated with each data stream, and perform an ACK coalescing on the subset of the plurality of data streams based on the associated ranks. The rank of each data stream may be determined using a set of weights applied to at least one metric of the data stream. The set of weights may be static or dynamic.

At 906, the receiver may receive a plurality of data streams from a transmitter, each data stream of the plurality of data streams including at least one data stream. For example, at 706, the receiver 702 may receive a plurality of data streams from a transmitter 704, each data stream of the plurality of data streams including at least one data stream. Furthermore, 906 may be performed by an ACK coalescing component 198.

At 920, the receiver may rank at least a subset of the plurality of data streams based on a metric that is based on a number of ACK associated with each data stream. That is, the receiver may rank the active data streams received from the transmitter and select a coalescing list of active streams to perform the ACK coalescing. The receiver may estimate a number of ACKs in the subsequent period for each active data streams, and rank the active data streams received from the transmitter during the second timer based on the estimated number of ACKs for the subsequent period. The receiver may select the coalescing list of the active streams for the receiver to perform the ACK coalescing based on the estimated number of ACKs in the subsequent period. For example, at 720, the receiver 702 may rank at least a subset of the plurality of data streams based on a metric that is based on a number of ACK associated with each data stream. Furthermore, 920 may be performed by the ACK coalescing component 198.

At 932, the receiver may transmit at least one subset of ACKs for the subset of data streams, where each subset of ACKs of the at least one subset of ACKs indicates a plurality of ACKs for a subset of packets of the subset of data streams. For example, at 732, the receiver 702 may transmit at least one subset of ACKs for the subset of data streams, where each subset of ACKs of the at least one subset of ACKs indicates a plurality of ACKs for a subset of packets of the subset of data streams. Furthermore, 932 may be performed by the ACK coalescing component 198.

Figure 10:
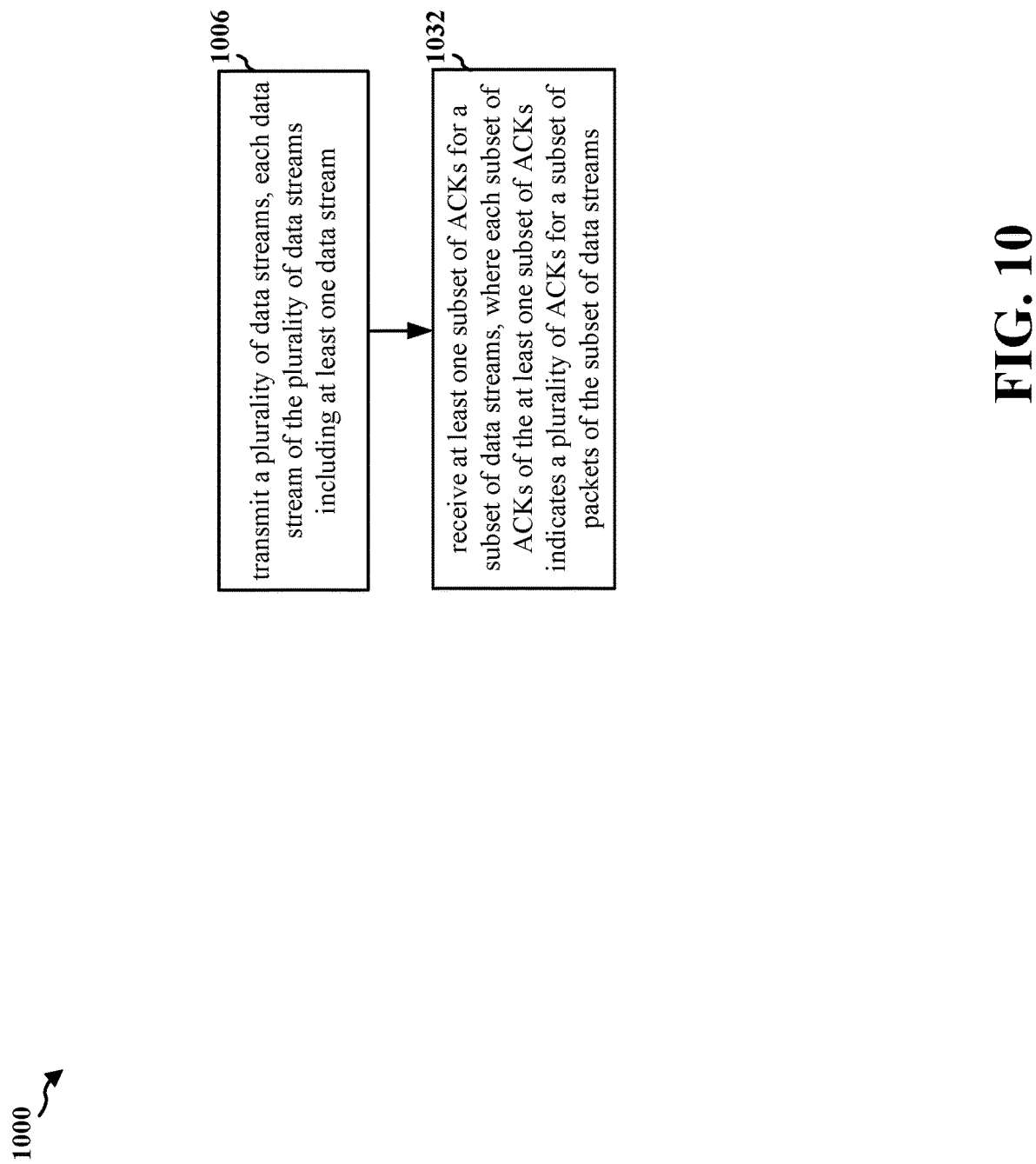
FIG. 10 is a flowchart of a method of wireless communication.

FIG. 10 is a flowchart 1000 of a method of wireless communication. The method may be performed by a transmitter (e.g., the base station 102; the transmitter 704; the network entity 1202/1360). Here, the transmitter may be a network node. The transmitter may transmit a plurality of data streams including at least one data stream to a receiver and receive a subset of ACKs based on an ACK coalescing.

At 1006, the transmitter may transmit a plurality of data streams to a receiver, each data stream of the plurality of data streams including at least one data stream. For example, at 706, the transmitter 704 may transmit a plurality of data streams to a receiver 702, each data stream of the plurality of data streams including at least one data stream. Furthermore, 1006 may be performed by an ACK processing component 199.

In some aspects, the receiver may rank at least a subset of the plurality of data streams based on a metric that is based on a number of ACK associated with each data stream. That is, the receiver may rank the active data streams received from the transmitter and select a coalescing list of active streams to perform the ACK coalescing. The receiver may estimate a number of ACKs in the subsequent period for each active data streams, and rank the active data streams received from the transmitter during the second timer based on the estimated number of ACKs for the subsequent period. The receiver may select the coalescing list of the active streams for the receiver to perform the ACK coalescing based on the estimated number of ACKs in the subsequent period.

At 1032, the transmitter may receive at least one subset of ACKs for the subset of data streams, where each subset of ACKs of the at least one subset of ACKs indicates a plurality of ACKs for a subset of packets of the subset of data streams, and each data stream of the subset of the data streams being associated with a rank based on a number of ACKs associated with each data stream. For example, at 732, the transmitter 704 may receive at least one subset of ACKs for the subset of data streams, where each subset of ACKs of the at least one subset of ACKs indicates a plurality of ACKs for a subset of packets of the subset of data streams, and each data stream of the subset of the data streams being associated with a rank based on a number of ACKs associated with each data stream. Furthermore, 1032 may be performed by the ACK processing component 199.

Figure 11:
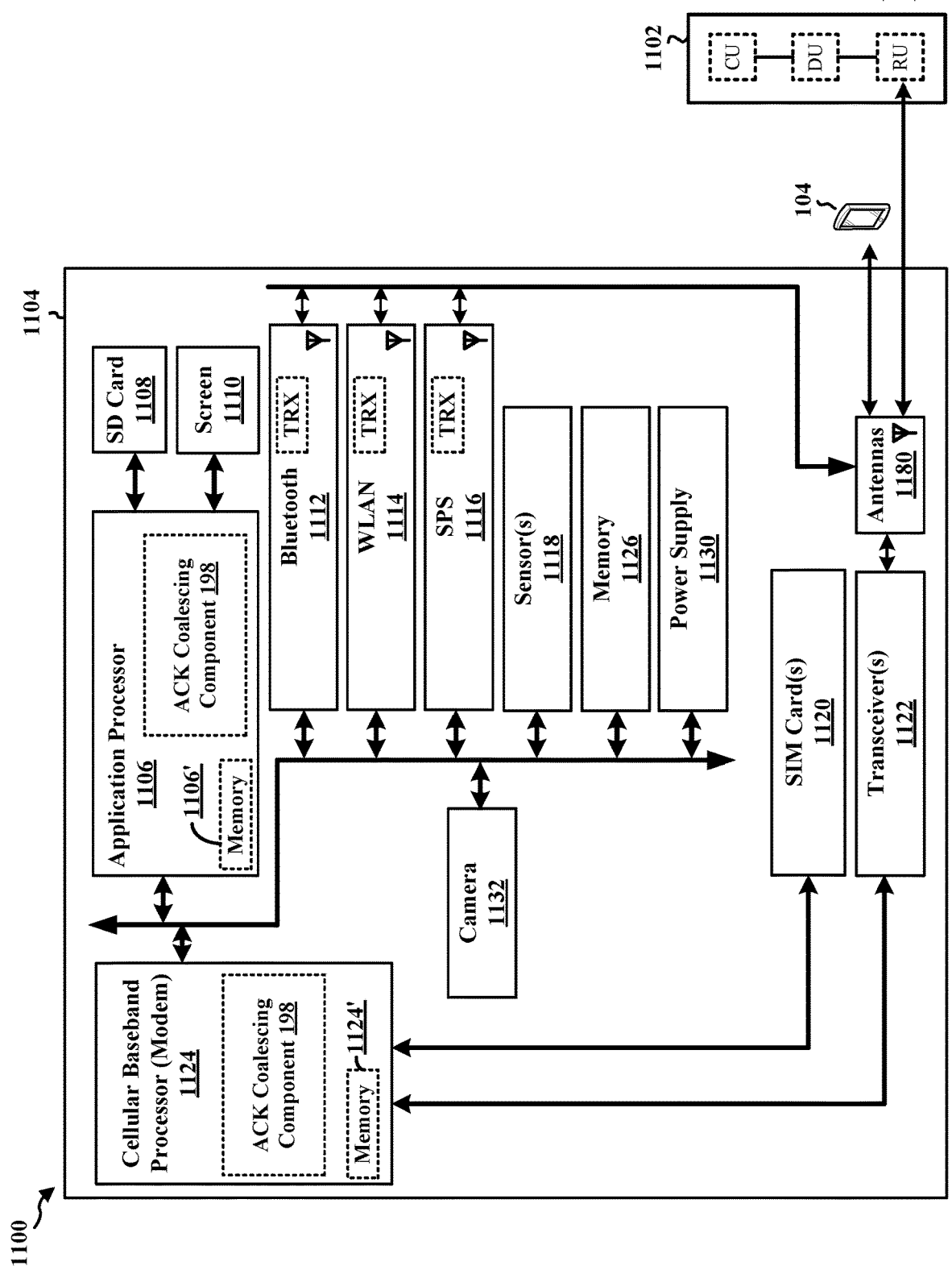
FIG. 11 is a diagram illustrating an example of a hardware implementation for an example apparatus and/or UE.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the ACK coalescing component 198 is configured to receive a plurality of data streams from a transmitter, each data stream of the plurality of data streams including at least one data stream, rank at least a subset of the plurality of data streams based on a metric that is based on a number of ACKs associated with each data stream, and transmit at least one subset of ACKs for the subset of data streams, where each subset of ACKs of the at least one subset of ACKs indicates a plurality of ACKs for a subset of packets of the subset of data streams. The ACK coalescing component 198 may be within the cellular baseband processor 1124, the application processor 1106, or both the cellular baseband processor 1124 and the application processor 1106. The ACK coalescing component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for receiving a plurality of data streams from a transmitter, each data stream of the plurality of data streams including at least one data stream, means for ranking at least a subset of the plurality of data streams based on a metric that is based on a number of ACKs associated with each data stream, and means for transmitting at least one subset of ACKs for the subset of the plurality of data streams, where each subset of ACKs of the at least one subset of ACKs indicates a plurality of ACKs for a subset of packets of the subset of the plurality of data streams. In one configuration, the apparatus 1104, and in particular the cellular baseband processor 1124 and/or the application processor 1106, further includes means for coalescing multiple ACKs for a threshold number of data streams based on an order of ACK generation prior to a first expiration of a first timer. In one configuration, the means for ranking at least the subset of the plurality of data streams is further configured to initiate a second timer based on a number of data streams of the plurality of data streams received before the first expiration of the first timer being greater than the threshold number of data streams, and sample a number of ACKs generated for each data stream of the plurality of data streams before a second expiration of the second timer, where the rank is based on the number of ACKs sampled for each data stream. In one configuration, where the rank of at least the subset of the plurality of data streams is generated based at least in part on an estimated number of ACKs for each data stream of the plurality of data streams. In one configuration, where the estimated number of ACKs for each data stream is generated based on an average number of ACKs based on a current number of ACKs generated for each data stream and at least one previous number of ACKs generated for each data stream. In one configuration, where the estimated number of ACKs for each data stream is determined based on a weighted sum of a current number of ACKs generated for each data stream and at least one previous number of ACKs generated for each data stream using at least one weight. In one configuration, where the means for ranking at least the subset of the plurality of data streams is further configured to generate the at least one weight for determining the estimated number of ACKs for each data stream using an artificial neural network (ANN) model, an input of the ANN model including at least the current number of ACKs generated for each data stream and the at least one previous number of ACKs generated for each data stream. In one configuration, where the rank for at least the subset of the plurality of data streams is generated based at least in part on a deviation of the number of ACKs for each data stream of the plurality of data streams, where the deviation of the number of ACKs for each data stream is based on a current number of ACKs generated for each data stream and at least one previous number of ACKs generated for each data stream. In one configuration, where, the means for ranking at least the subset of the plurality of data streams is further configured to update the subset of the plurality of data streams by replacing at least one lowest rank data stream of the subset of the plurality of data streams with at least one replacement data stream other than the subset of the plurality of data streams, where the at least one replacement data stream has a first metric greater than a second metric of the at least one lowest rank data stream. In one configuration, where the first metric is greater than the second metric by a threshold value. The means may be the ACK coalescing component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
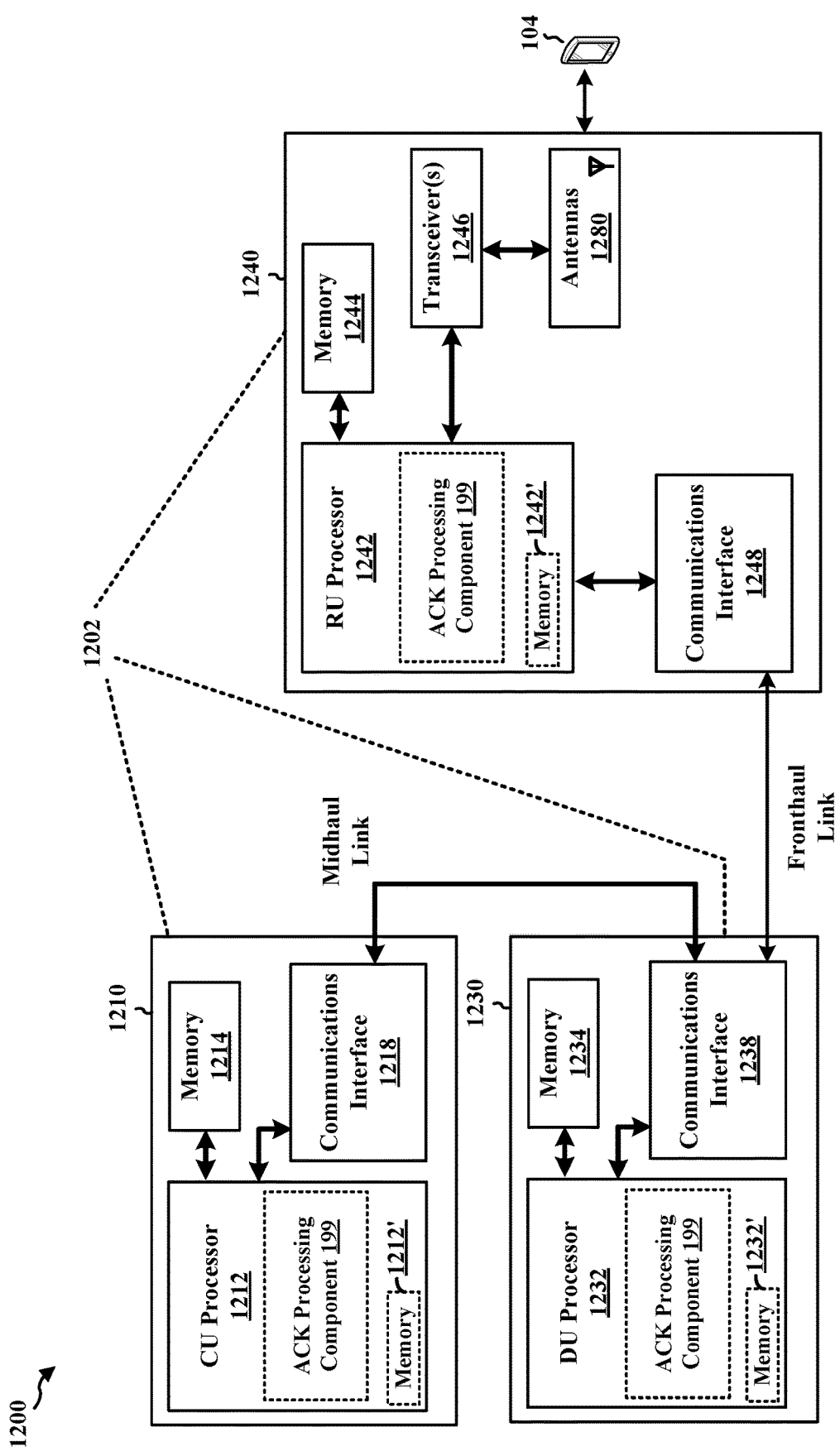
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the ACK processing component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the ACK processing component 199 is configured to transmit a plurality of data streams to a receiver, obtain a list of a subset of data streams of the plurality of data streams from the receiver, the list of subset of data streams indicating ranks of each data stream of the subset of data streams based on a metric of each data stream being based at least on each number of ACKs generated for each data stream, and receive at least one subset of ACKs for the subset of data streams, where each subset of ACKs of the at least one subset of ACKs indicates a plurality of ACKs for a subset of packets of the subset of data streams. The ACK processing component 199 may be within one or more processors of one or more of the CU 1210, DU 1230, and the RU 1240. The ACK processing component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for transmitting a plurality of data streams to a receiver, and means for receiving at least one subset of ACKs for the subset of the data streams, wherein each subset of ACKs of the at least one subset of ACKs indicates a plurality of ACKs for a subset of packets of the subset of the data streams, and each data stream of the subset of the data streams being associated with a rank based on a number of acknowledgements (ACKs) associated with each data stream. The means may be the ACK processing component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
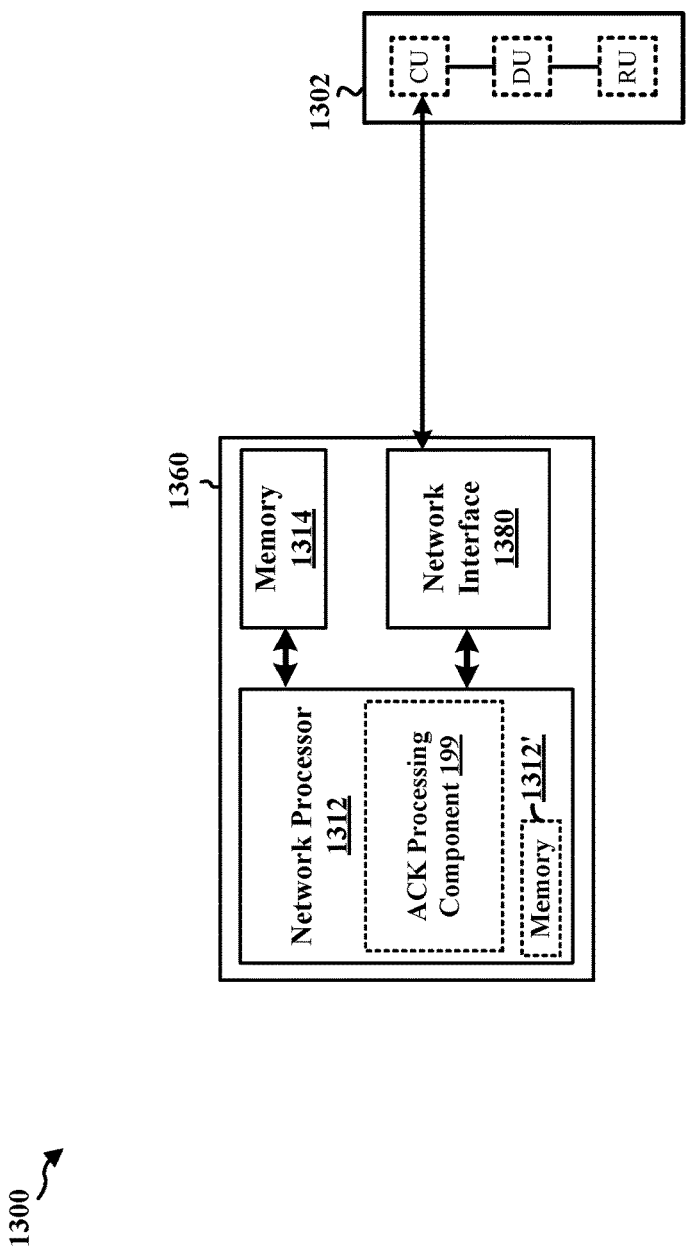
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 110. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the ACK processing component 199 is configured to transmit a plurality of data streams to a receiver, obtain a list of a subset of data streams of the plurality of data streams from the receiver, the list of subset of data streams indicating ranks of each data stream of the subset of data streams based on a metric of each data stream being based at least on each number of ACKs generated for each data stream, and receive at least one subset of ACKs for the subset of data streams, where each subset of ACKs of the at least one subset of ACKs indicates a plurality of ACKs for a subset of packets of the subset of data streams. The ACK processing component 199 may be within the processor 1312. The ACK processing component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for transmitting a plurality of data streams to a receiver, and means for receiving at least one subset of ACKs for the subset of the data streams, wherein each subset of ACKs of the at least one subset of ACKs indicates a plurality of ACKs for a subset of packets of the subset of the data streams, and each data stream of the subset of the data streams being associated with a rank based on a number of acknowledgements (ACKs) associated with each data stream. The means may be the ACK processing component 199 of the network entity 1360 configured to perform the functions recited by the means.

In some aspects of the current disclosure, a receiver may receive a plurality of data streams including at least one data stream from a transmitter, rank at least a subset of the plurality of data streams based on a metric that is based on a number of ACK associated with each data stream, and perform an ACK coalescing on the subset of the plurality of data streams based on the associated ranks. In one aspect, the receiver may receive a plurality of data streams from a transmitter, each data stream of the plurality of data streams including at least one data stream, rank at least a subset of the plurality of data streams based on a metric that is based on a number of ACKs associated with each data stream, and transmit at least one subset of ACKs for the subset of data streams, wherein each subset of ACKs of the at least one subset of ACKs indicates a plurality of ACKs for a subset of packets of the subset of data streams. In another aspect, the transmitter may transmit a plurality of data streams to a receiver, obtain a list of a subset of data streams of the plurality of data streams from the receiver, the list of subset of data streams indicating ranks of each data stream of the subset of data streams based on a metric of each data stream being based at least on each number of ACKs generated for each data stream, and receive at least one subset of ACKs for the subset of data streams, wherein each subset of ACKs of the at least one subset of ACKs indicates a plurality of ACKs for a subset of packets of the subset of data streams. The receiver may be a UE, and the transmitter may be the network node. The rank of each data stream may be determined using a set of weights applied to at least one metric of the data stream. The set of weights may be static or dynamic.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a receiver, including receiving a plurality of data streams from a transmitter, each data stream of the plurality of data streams including at least one data stream, ranking at least a subset of the plurality of data streams based on a metric that is based on a number of ACKs associated with each data stream, and transmitting at least one subset of ACKs for the subset of the plurality of data streams, where each subset of ACKs of the at least one subset of ACKs indicates a plurality of ACKs for a subset of packets of the subset of the plurality of data streams.

Aspect 2 is the method of aspect 1, further including coalescing multiple ACKs for a threshold number of data streams based on an order of ACK generation prior to a first expiration of a first timer.

Aspect 3 is the method of aspect 2, where ranking at least the subset of the plurality of data streams further includes initiating a second timer based on a number of data streams of the plurality of data streams received before the first expiration of the first timer being greater than the threshold number of data streams, and sampling a number of ACKs generated for each data stream of the plurality of data streams before a second expiration of the second timer, where the rank is based on the number of ACKs sampled for each data stream.

Aspect 4 is the method of aspect 3, where the rank of at least the subset of the plurality of data streams is generated based at least in part on an estimated number of ACKs for each data stream of the plurality of data streams.

Aspect 5 is the method of aspect 4, where the estimated number of ACKs for each data stream is generated based on an average number of ACKs based on a current number of ACKs generated for each data stream and at least one previous number of ACKs generated for each data stream.

Aspect 6 is the method of any of aspects 4 and 5, where the estimated number of ACKs for each data stream is determined based on a weighted sum of a current number of ACKs generated for each data stream and at least one previous number of ACKs generated for each data stream using at least one weight.

Aspect 7 is the method of aspect 6, where ranking at least the subset of the plurality of data streams further includes generating the at least one weight for determining the estimated number of ACKs for each data stream using an ANN model, an input of the ANN model including at least the current number of ACKs generated for each data stream and the at least one previous number of ACKs generated for each data stream.

Aspect 8 is the method of any of aspects 3 to 7, where the rank for at least the subset of the plurality of data streams is generated based at least in part on a deviation of the number of ACKs for each data stream of the plurality of data streams, where the deviation of the number of ACKs for each data stream is based on a current number of ACKs generated for each data stream and at least one previous number of ACKs generated for each data stream.

Aspect 9 is the method of any of aspects 1 to 8, where ranking at least the subset of the plurality of data streams further includes updating the subset of the plurality of data streams by replacing at least one lowest rank data stream of the subset of the plurality of data streams with at least one replacement data stream other than the subset of the plurality of data streams, where the at least one replacement data stream has a first metric greater than a second metric of the at least one lowest rank data stream.

Aspect 10 is the method of aspect 9, where the first metric is greater than the second metric by a threshold value.

Aspect 11 is an apparatus for wireless communication including at least one processor coupled to a memory and configured to implement any of aspects 1 to 10, further including a transceiver coupled to the at least one processor.

Aspect 12 is an apparatus for wireless communication including means for implementing any of aspects 1 to 10.

Aspect 13 is a non-transitory computer-readable medium storing computer executable code, where the code when executed by a processor causes the processor to implement any of aspects 1 to 10.

Aspect 14 is a method of wireless communication at a transmitter, including transmitting a plurality of data streams to a receiver, and receiving at least one subset of ACKs for the subset of the plurality of data streams, wherein each subset of ACKs of the at least one subset of ACKs indicates a plurality of ACKs for a subset of packets of the subset of the plurality of data streams, and each data stream of the subset of the plurality of data streams being associated with a rank based on a number of ACKs associated with each data stream.

Aspect 15 is an apparatus for wireless communication including at least one processor coupled to a memory and configured to implement the aspect 14, further including a transceiver coupled to the at least one processor.

Aspect 16 is an apparatus for wireless communication including means for implementing the aspect 14.

Aspect 17 is a non-transitory computer-readable medium storing computer executable code, where the code when executed by a processor causes the processor to implement the aspect 14.

What is claimed is:

1. An apparatus for wireless communication at a receiver, comprising:
    memory; and
    at least one processor coupled to the memory and, based at least in part on information stored in the memory, the at least one processor is configured to:
        receive a plurality of data streams from a transmitter, each data stream of the plurality of data streams including at least one data stream;
        sample, based on a number of data streams of the plurality of data streams being greater than a threshold number of data streams, a number of acknowledgements (ACKs) generated for each data stream of the plurality of data streams during a period of time;
        rank the plurality of data streams based on the number of ACKs sampled for each data stream during the period of time to identify a subset of the plurality of data streams; and
        transmit at least one subset of ACKs for the subset of the plurality of data streams, wherein each subset of ACKs of the at least one subset of ACKs indicates a plurality of ACKs for a subset of packets of the subset of the plurality of data streams.

2. The apparatus of claim 1, wherein the subset of the plurality of data streams is based on the threshold number of data streams, and wherein the at least one processor is further configured to:
    coalesce multiple ACKs for the threshold number of data streams based on an order of ACK generation prior to a first expiration of a first timer.

3. The apparatus of claim 2, wherein the at least one processor is further configured to:
    initiate a second timer based on the number of data streams of the plurality of data streams received before the first expiration of the first timer being greater than the threshold number of data streams, wherein the period of time to sample the number of ACKs is based on the second timer.

4. The apparatus of claim 3, wherein the rank of at least the subset of the plurality of data streams is generated based at least in part on an estimated number of ACKs for each data stream of the plurality of data streams.

5. The apparatus of claim 4, wherein the estimated number of ACKs for each data stream is generated based on an average number of ACKs based on a current number of ACKs generated for each data stream and at least one previous number of ACKs generated for each data stream.

6. The apparatus of claim 4, wherein the estimated number of ACKs for each data stream is determined based on a weighted sum of a current number of ACKs generated for each data stream and at least one previous number of ACKs generated for each data stream using at least one weight.

7. The apparatus of claim 6, wherein, to rank at least the subset of the plurality of data streams, the at least one processor is further configured to:
    generate the at least one weight for determining the estimated number of ACKs for each data stream using an artificial neural network (ANN) model, an input of the ANN model including at least the current number of ACKs generated for each data stream and the at least one previous number of ACKs generated for each data stream.

8. The apparatus of claim 3, wherein the rank for at least the subset of the plurality of data streams is generated based at least in part on a deviation of the number of ACKs for each data stream of the plurality of data streams, wherein the deviation of the number of ACKs for each data stream is based on a current number of ACKs generated for each data stream and at least one previous number of ACKs generated for each data stream.

9. The apparatus of claim 1, wherein, to rank of at least the subset of the plurality of data streams, the at least one processor is further configured to:
    update the subset of the plurality of data streams by replacing at least one lowest rank data stream of the subset of the plurality of data streams with at least one replacement data stream other than the subset of the plurality of data streams,
    wherein the at least one replacement data stream has a first metric greater than a second metric of the at least one lowest rank data stream.

10. The apparatus of claim 9, further comprising a transceiver coupled to the at least one processor,
    wherein the first metric is greater than the second metric by a threshold value.

11. A method of wireless communication at a receiver, comprising:
    receiving a plurality of data streams from a transmitter, each data stream of the plurality of data streams including at least one data stream;
    sampling, based on a number of data streams of the plurality of data streams being greater than a threshold number of data streams, a number of acknowledgements (ACKs) generated for each data stream of the plurality of data streams during a period of time;
    ranking the plurality of data streams based on the number of ACKs sampled for each data stream during the period of time to identify a subset of the plurality of data streams; and
    transmitting at least one subset of ACKs for the subset of the plurality of data streams, wherein each subset of ACKs of the at least one subset of ACKs indicates a plurality of ACKs for a subset of packets of the subset of the plurality of data streams.

12. The method of claim 11, wherein the subset of the plurality of data streams is based on the threshold number of data streams, and wherein the method further comprises:
    coalescing multiple ACKs for the threshold number of data streams based on an order of ACK generation prior to a first expiration of a first timer.

13. The method of claim 12, further comprising:
    initiating a second timer based on the number of data streams of the plurality of data streams received before the first expiration of the first timer being greater than the threshold number of data streams, wherein the period of time to sample the number of ACKs is based on the second timer.

14. The method of claim 13, wherein the rank of at least the subset of the plurality of data streams is generated based at least in part on an estimated number of ACKs for each data stream of the plurality of data streams.

15. The method of claim 14, wherein the estimated number of ACKs for each data stream is generated based on an average number of ACKs based on a current number of ACKs generated for each data stream and at least one previous number of ACKs generated for each data stream.

16. The method of claim 14, wherein the estimated number of ACKs for each data stream is determined based on a weighted sum of a current number of ACKs generated for each data stream and at least one previous number of ACKs generated for each data stream using at least one weight.

17. The method of claim 16, wherein ranking at least the subset of the plurality of data streams further comprises:
generating the at least one weight for determining the estimated number of ACKs for each data stream using an artificial neural network (ANN) model, an input of the ANN model including at least the current number of ACKs generated for each data stream and the at least one previous number of ACKs generated for each data stream.

18. The method of claim 13, wherein the rank for at least the subset of the plurality of data streams is generated based at least in part on a deviation of the number of ACKs for each data stream of the plurality of data streams, wherein the deviation of the number of ACKs for each data stream is based on a current number of ACKs generated for each data stream and at least one previous number of ACKs generated for each data stream.

19. The method of claim 11, wherein ranking at least the subset of the plurality of data streams further comprises:
updating the subset of the plurality of data streams by replacing at least one lowest rank data stream of the subset of the plurality of data streams with at least one replacement data stream other than the subset of the plurality of data streams,
wherein the at least one replacement data stream has a first metric greater than a second metric of the at least one lowest rank data stream.

20. The method of claim 19, wherein the first metric is greater than the second metric by a threshold value.

21. An apparatus for wireless communication at a receiver, comprising:
means for receiving a plurality of data streams from a transmitter, each data stream of the plurality of data streams including at least one data stream;
means for sampling, based on a number of data streams of the plurality of data streams being greater than a threshold number of data streams, a number of acknowledgements (ACKs) generated for each data stream of the plurality of data streams during a period of time;
means for ranking the plurality of data streams based on the number of ACKs sampled for each data stream during the period of time to identify a subset of the plurality of data streams; and
means for transmitting at least one subset of ACKs for the subset of the plurality of data streams, wherein each subset of ACKs of the at least one subset of ACKs indicates a plurality of ACKs for a subset of packets of the subset of the plurality of data streams.

22. The apparatus of claim 21, wherein the subset of the plurality of data streams is based on the threshold number of data streams, and wherein the apparatus further includes:
means for coalescing multiple ACKs for the threshold number of data streams based on an order of ACK generation prior to a first expiration of a first timer.

23. The apparatus of claim 22, wherein, the means for ranking at least the subset of the plurality of data streams is further configured to:
initiate a second timer based on the number of data streams of the plurality of data streams received before the first expiration of the first timer being greater than the threshold number of data streams, wherein the period of time to sample the number of ACKs is based on the second timer.

24. The apparatus of claim 23, wherein the rank of at least the subset of the plurality of data streams is generated based at least in part on an estimated number of ACKs for each data stream of the plurality of data streams.

25. The apparatus of claim 24, wherein the estimated number of ACKs for each data stream is generated based on an average number of ACKs based on a current number of ACKs generated for each data stream and at least one previous number of ACKs generated for each data stream.

26. The apparatus of claim 24, wherein the estimated number of ACKs for each data stream is determined based on a weighted sum of a current number of ACKs generated for each data stream and at least one previous number of ACKs generated for each data stream using at least one weight.

27. The apparatus of claim 26, wherein, the means for ranking at least the subset of the plurality of data streams is further configured to:
generate the at least one weight for determining the estimated number of ACKs for each data stream using an artificial neural network (ANN) model, an input of the ANN model including at least the current number of ACKs generated for each data stream and the at least one previous number of ACKs generated for each data stream.

28. The apparatus of claim 23, wherein the rank for at least the subset of the plurality of data streams is generated based at least in part on a deviation of the number of ACKs for each data stream of the plurality of data streams, wherein the deviation of the number of ACKs for each data stream is based on a current number of ACKs generated for each data stream and at least one previous number of ACKs generated for each data stream.

29. The apparatus of claim 21, wherein, the means for ranking at least the subset of the plurality of data streams is further configured to:
update the subset of the plurality of data streams by replacing at least one lowest rank data stream of the subset of the plurality of data streams with at least one replacement data stream other than the subset of the plurality of data streams,
wherein the at least one replacement data stream has a first metric greater than a second metric of the at least one lowest rank data stream.

30. An apparatus for wireless communication at a transmitter, comprising:
memory; and
at least one processor coupled to the memory and, based at least in part on information stored in the memory, the at least one processor is configured to:
transmit a plurality of data streams to a receiver; and
receive, based on a number of data streams in the plurality of data streams being greater than a threshold number of data streams, coalesced acknowledgements (ACKs) for a subset of the plurality of data streams, wherein the coalesced ACKs indicate a plurality of ACKs for a subset of packets of the subset of the plurality of data streams, and each data stream of the subset of the plurality of data streams being associated with a rank within the plurality of data streams based on a number of sampled acknowledgements (ACKs) associated with each data stream during a period of time.

* * * * *